US008805803B2

(12) United States Patent
Simske et al.

(10) Patent No.: US 8,805,803 B2
(45) Date of Patent: Aug. 12, 2014

(54) INDEX EXTRACTION FROM DOCUMENTS

(75) Inventors: Steven J. Simske, Fort Collins, CO (US); David W. Wright, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1735 days.

(21) Appl. No.: 10/916,877

(22) Filed: Aug. 12, 2004

(65) Prior Publication Data

US 2006/0036614 A1    Feb. 16, 2006

(51) Int. Cl.
*G06F 7/00* (2006.01)
*G06F 17/30* (2006.01)

(52) U.S. Cl.
CPC .... *G06F 17/30613* (2013.01); *G06F 17/30705* (2013.01)
USPC ............ 707/694; 707/696; 707/741; 715/257

(58) Field of Classification Search
USPC .......................... 707/694, 696, 741; 715/257
See application file for complete search history.

(56) References Cited

U.S. PATENT DOCUMENTS

| | | | |
|---|---|---|---|
| 5,818,952 A * | 10/1998 | Takenouchi et al. .......... 382/101 |
| 5,870,700 A * | 2/1999 | Parra ................................ 704/9 |
| 5,893,908 A | 4/1999 | Cullen et al. |
| 5,943,669 A | 8/1999 | Numata |
| 5,978,477 A | 11/1999 | Hull et al. |
| 6,092,090 A | 7/2000 | Payne et al. |
| 6,192,165 B1 | 2/2001 | Irons |
| 6,199,073 B1 | 3/2001 | Peairs et al. |
| 6,205,428 B1 | 3/2001 | Brown et al. |
| 6,233,571 B1 | 5/2001 | Egger et al. |
| 6,236,767 B1 | 5/2001 | Altman |
| 6,243,501 B1 * | 6/2001 | Jamali ............................ 382/305 |
| 6,295,543 B1 * | 9/2001 | Block et al. .................... 715/530 |
| 6,456,747 B2 | 9/2002 | Altman |
| 6,522,780 B1 | 2/2003 | Pass et al. |
| 6,546,385 B1 | 4/2003 | Mao et al. |
| 6,668,256 B1 | 12/2003 | Lynch |
| 6,678,705 B1 | 1/2004 | Berchtold et al. |
| 6,704,118 B1 | 3/2004 | Hull et al. |

(Continued)

FOREIGN PATENT DOCUMENTS

| | | |
|---|---|---|
| EP | 0784280 | 7/1997 |
| EP | 1049030 | 11/2000 |
| GB | 2395301 | 5/2004 |

OTHER PUBLICATIONS

Steven J. Simske et al., U.S. Appl. No. 10/916,942, filed Aug. 12, 2004 (Related Application).

(Continued)

*Primary Examiner* — Sherief Badawi
*Assistant Examiner* — Christopher J Raab

(57) ABSTRACT

Systems, methods, and programs embodied in a computer readable medium are provided for index extraction. Stored in a database are ground truth documents that are organized according to a plurality of classifications, each classification having a group of predefined indices. A document to be indexed is classified by drawing an association between the document and one of the classifications. An attempt is made to extract from the document at least a subset of the group of predefined indices associated with the one of the classifications. Upon a failure to extract the subset of the group of predefined indices, attempts are made to find and correct at least one text recognition error in the document based upon a salient dictionary associated with the one of the classifications.

30 Claims, 12 Drawing Sheets

(56) References Cited

U.S. PATENT DOCUMENTS

| | | |
|---|---|---|
| 6,744,936 B2 | 6/2004 | Irons et al. |
| 6,976,207 B1 * | 12/2005 | Rujan et al. .................. 715/500 |
| 2001/0016852 A1 | 8/2001 | Peairs et al. |
| 2001/0034738 A1 | 10/2001 | Cantwell et al. |
| 2001/0042085 A1 | 11/2001 | Peairs et al. |
| 2001/0049706 A1 | 12/2001 | Thorne |
| 2002/0007287 A1 | 1/2002 | Straube et al. |
| 2002/0059202 A1 | 5/2002 | Hadzikadic et al. |
| 2002/0156827 A1 | 10/2002 | Lazar |
| 2003/0084022 A1 | 5/2003 | Nakano |
| 2003/0152277 A1 * | 8/2003 | Hall et al. .................. 382/229 |
| 2004/0074961 A1 | 4/2004 | Hull et al. |
| 2005/0289103 A1 | 12/2005 | Bier |
| 2007/0185824 A1 | 8/2007 | Hitt |
| 2008/0147663 A1 * | 6/2008 | Vernau et al. .................. 707/7 |

OTHER PUBLICATIONS

Steven J. Simske, et al., U.S. Appl. No. 10/916,878, filed Aug. 12, 2004 (Related Application).

British Search Report for Patent Application No. GB0516010.6 filed Aug. 3, 2005. Report issued Oct. 18, 2005.

Steven J. Simske et al; U.S. Appl. No. 10/916,877; filed Aug. 12, 2004; (HP 200401785-1).

* cited by examiner

| Class Indexing Statistics 246 | | | | | | |
|---|---|---|---|---|---|---|
| Entity | 1 | 2 | 3 | ○ ○ ○ | N | 263 |
| % confidence | 80 | 75 | 60 | ○ ○ ○ | 95 | 266 |
| Time/page | 50 ms | 90 ms | 2 ms | ○ ○ ○ | 2 ms | 269 |
| Cost per use | $0.10 | $0.15 | $0.02 | ○ ○ ○ | $0.01 | |

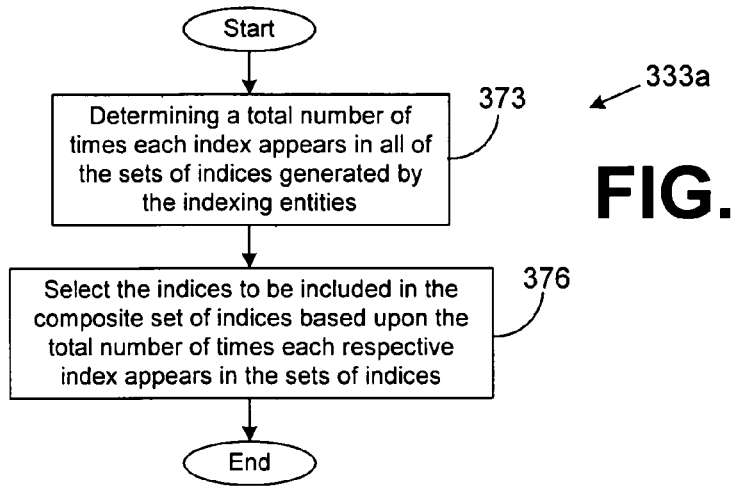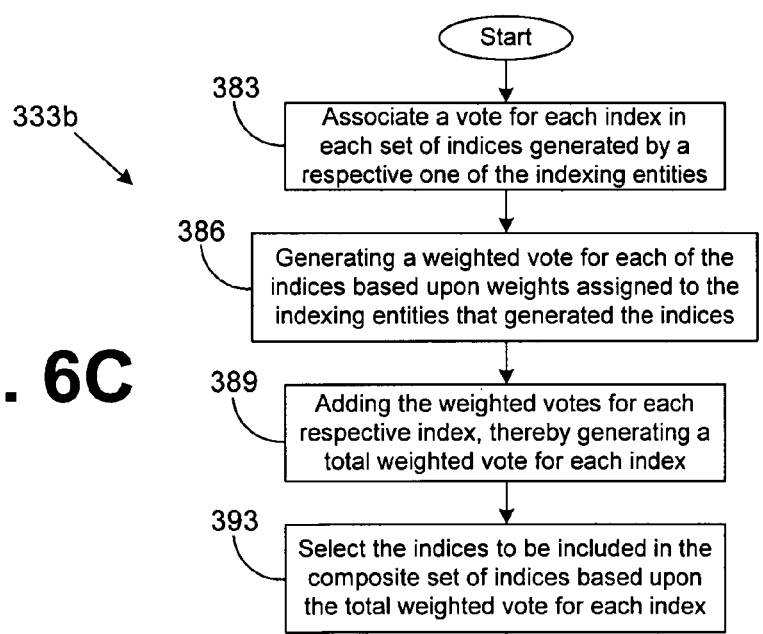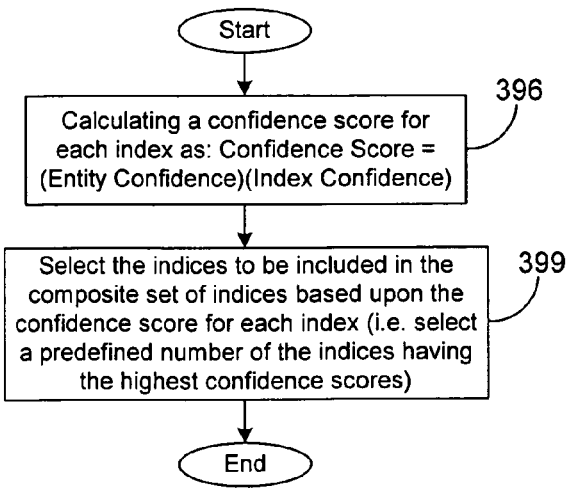

INDEX EXTRACTION FROM DOCUMENTS

CROSS REFERENCE TO RELATED APPLICATIONS

This application is related to U.S. patent application entitled "INDEX EXTRACTION FROM DOCUMENTS", filed on even date herewith and assigned application Ser. No. 10/916,878, and to U.S. patent application entitled "INDEX EXTRACTION FROM DOCUMENTS", filed on even date herewith and assigned application Ser. No. 10/916,942.

BACKGROUND

The operation of many businesses, nonprofit organizations, government institutions, and other organizations turn out an endless stream of paper documents that need to be placed in long term storage for future use. The storage of documents is quite expensive. Often times an organization typically may have to lease expensive space just for filing cabinets to store documents. In addition, depending upon the importance of the documents, fire prevention equipment may be installed in such spaces, thereby increasing the cost of storage.

In response, many organizations prefer to convert paper documents into digital form for long term storage in a server or other mass data storage device. In order to store documents so that they may be easily located in the future, several indices are identified in each document that are associated with the document as metadata that facilitate document searching. In order to identify the metadata in each document, a manual process is typically employed in which an individual examines the document and identifies the metadata within the document. Such a manual process is very expensive and thus hinders the ability of many organizations to convert their paper documents into digital documents.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIGS. 6A-6G are flow charts that illustrate one example of the operation of the automated document indexing system of FIG. 2, according to an embodiment of the present invention;

DETAILED DESCRIPTION

According to various embodiments of the present invention, an automated document indexing system is described. For the convenience of the reader, the discussion that follows begins with a description of a physical network followed by a discussion of the operation of various components in the network.

Figure 1:
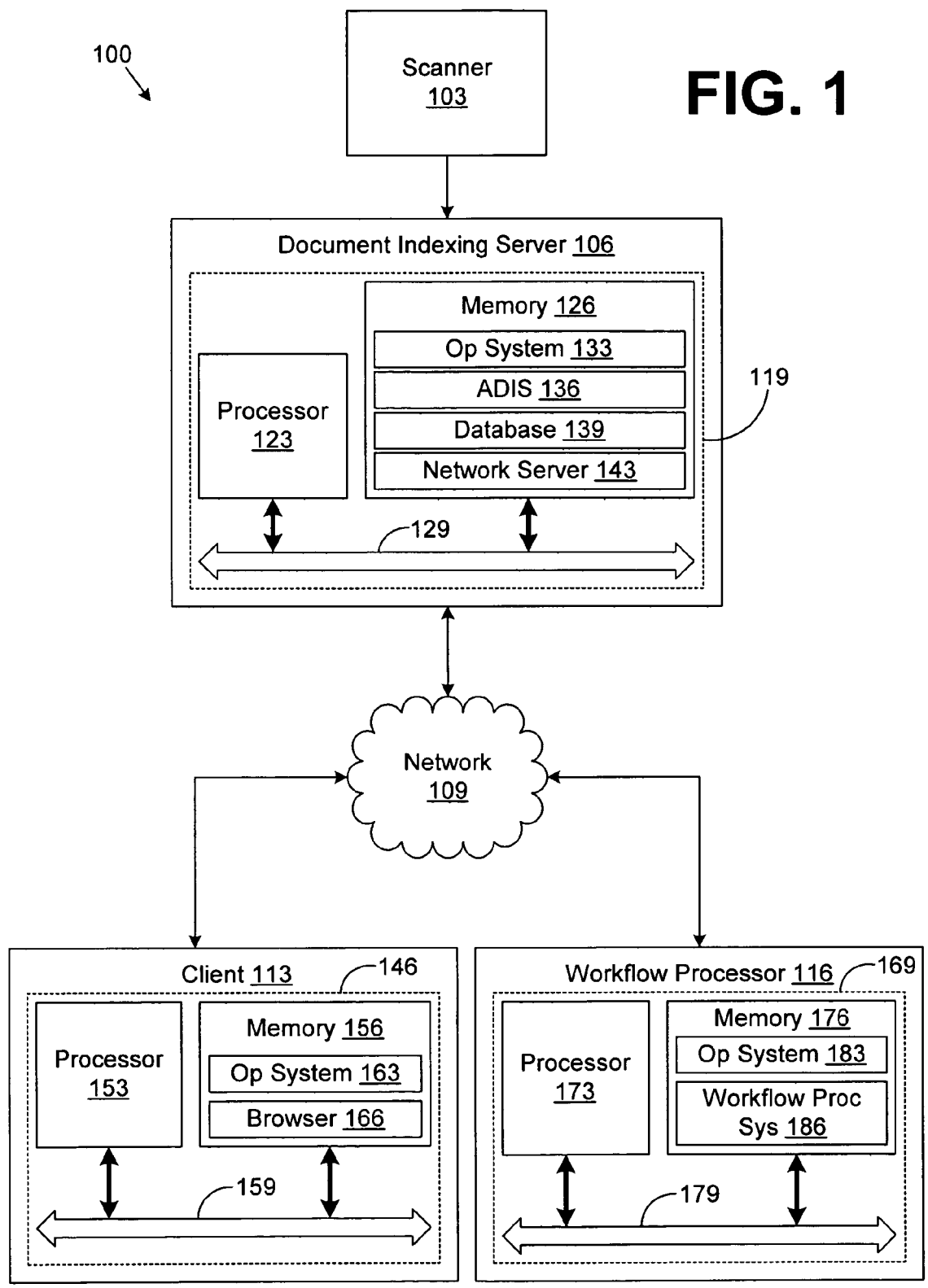
FIG. 1 is a block diagram that illustrates a document indexing network, according to an embodiment of the present invention.

With reference to FIG. 1, shown is a block diagram of a document indexing network 100, according to an embodiment of the present invention. The document indexing network 100 includes, for example, a scanner 103 that is coupled to a document indexing server 106. In this respect, the scanner 103 is in data communication with the document indexing server 106. The document indexing server 106 is coupled to a network 109. Also coupled to the network 109 is a client 113 and a workflow processor 116. In this respect, the network 109 may be, for example, the Internet, intranets, wide area networks (WANs), local area networks, wireless networks, or other suitable networks, etc., or any combination of two or more such networks.

Alternatively, the scanner 103 may also be coupled to the network 109 and may communicate with the document indexing server 106 through the network 109, as can be appreciated. In addition, the client 113 and the workflow processor 116 are each representative of what may be multiple clients 113 or multiple workflow processors 116 that are coupled to the network 109 and are in data communication with the document indexing server 106.

The document indexing server 106 includes a processor circuit 119 having a processor 123 and a memory 126, both of which are coupled to a local interface 129. The local interface 129 may be, for example, a data bus with an accompanying control/address bus, as can be appreciated by those with ordinary skill in the art. In this respect, the document indexing server 106 may be, for example, a server, computer system, or other device with like capability, etc.

Stored within the memory 126 of the document indexing server 106 and executable by the processor 123 are various components such as, for example, an operating system 133, an automated document indexing system 136, a database 139, and a network server 143. The automated document indexing system 136 is executed by the processor 123 for the automated indexing of documents, as will be described. Stored within the database 139 are so called "ground truth" documents and other information that is stored in conjunction with the operation of the automated document indexing system 136, as will be described. The network server 143 may comprise, for example, a web server or other type of server that provides browser access to information and user interfaces generated by the automated document indexing system 136 as will be described.

The client 113 also includes a processor circuit 146 that comprises a processor 153 and a memory 156, both of which are coupled to a local interface 159. The local interface 159 may be, for example, a data bus with an accompanying control/address bus, as can be appreciated by those with ordinary skill in the art. In this respect, the client 113 may comprise, for example, a computer system such as, a desktop, laptop, personal digital assistant, or other device with like capability, etc.

Stored within the memory 156 and executable by the processor 153 are various components such as, for example, an operating system 163 and a browser 166. In this respect, the browser 166 facilitates access to information and user interfaces in the document indexing server 103 through the network server 143. Specifically, by manipulating the browser 166 of the client 113, a user may access information and user interfaces from the document indexing server 106 through the network server 143, as will be discussed. In addition, other applications may be executed in the client 113. Also, the browser 166 is provided as one example of any number of applications or programs that may be employed in the client 113 to gain access to interfaces and other functionality in the document indexing server 166. For example, the browser may be replaced with a client graphical user interface and appropriate network access software, etc.

The workflow processor 116 also includes a processor circuit 169. In this respect, the processor circuit 169 includes a processor 173 and a memory 176, both of which are coupled to a local interface 179. In this respect, the local interface 179 may be a data/control bus, as can be appreciated by those with ordinary skill in the art. The workflow processor 116 may comprise, for example, a server, computer system, or other device with like capability.

Stored within the memory 176 and executable by the processor 173 are an operating system 183 and a workflow processing system 186. The workflow processing system 186 is executed to perform one or more tasks upon a set of indices extracted from a document by the automated document indexing system 136, as will be described.

In addition, the document indexing server 106, the client 113, and/or the workflow processor 116 may each include various peripheral devices (not shown) such as, for example, keyboards, keypads, touch pads, touch screens, microphones, a mouse, joysticks, or one or more push buttons, etc. The peripheral devices may also include display devices, indicator lights, speakers, printers, etc.

As mentioned above, a number of software components are stored in the memories 126, 156, and 176 and are executable by the respective processors 123, 153, and 173. In this respect, the term "executable" means a program file that is in a form that can ultimately be run by the respective processors 123, 153, and 173. Examples of executable programs may be, for example, a compiled program that can be translated into machine code in a format that can be loaded into a random access portion of the memories 126, 156, and 176 and run by the respective processors 123, 153, and 173, or source code that may be expressed in proper format such as object code that is capable of being loaded into a of random access portion of the memories 126, 156, and 176 and executed by the respective processors 123, 153, and 173, etc. An executable program may be stored in any portion or component of each the memories 126, 156, and 176 including, for example, random access memory, read-only memory, a hard drive, compact disk (CD), floppy disk, or other memory components.

In this respect, each of the memories 126, 156, and 176 is defined herein as both volatile and nonvolatile memory and data storage components. Volatile components are those that do not retain data values upon loss of power. Nonvolatile components are those that retain data upon a loss of power. Thus, each of the memories 126, 156, and 176 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 123, 153, and 173 may represent multiple processors and each of the memories 126, 156, and 176 may represent multiple memories that operate in parallel processing circuits, respectively. In such a case, each of the local interfaces 129, 159, and 179 may be an appropriate network that facilitates communication between any two of the multiple processors, between any processor and any of the memories, or between any two of the memories, etc. The processors 123, 153, and 173 may be of electrical or optical construction, or of some other construction, as can be appreciated by those with ordinary skill in the art.

Each of the operating systems 133, 163, and 183 is executed to control the allocation and usage of hardware resources such as the memory, processing time and peripheral devices in the document indexing server 106, the client 113, and the workflow processor 116. In this manner, each of the operating systems 133, 163, and 183 serve as the foundation on which various components and applications depend as is generally known by those with ordinary skill in the art.

In addition, it is understood that while the various components such as the automated document indexing system 136, the browser 166, and the workflow processing system 186 are depicted as being executed on the document indexing server 106, client 113, and workflow processor 116, it is understood that all of these components may also be executed on a single server or device. Alternatively, the execution of each of these components may be distributed among multiple servers, computer systems, or other devices as can be appreciated. Thus, the document indexing network 100 described above merely provides one example of the various different configurations of document indexing networks 100 that may be employed to facilitate the execution of the various components herein.

Figure 2:
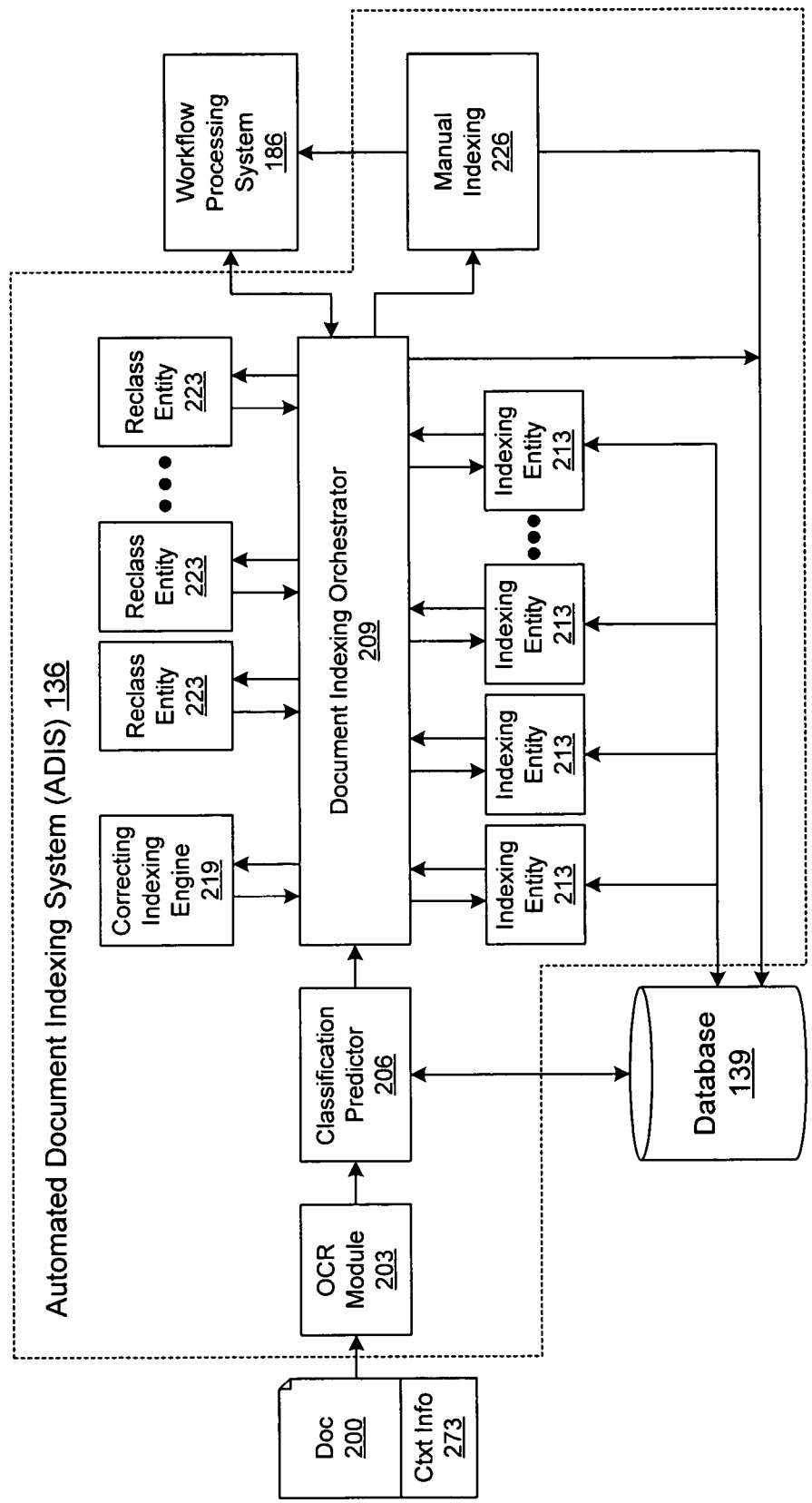
FIG. 2 is a functional block diagram that illustrates an automated document indexing system executed in a server of FIG. 1, according to an embodiment of the present invention.

Turning then to FIG. 2, shown is a functional block diagram that illustrates one example of the architecture of the automated document indexing system 136, according to an embodiment of the present invention. As shown in FIG. 2, each block represents a module, object, or other grouping or encapsulation of underlying functionality as implemented in programming code. However, the same underlying functionality may exist in one or more modules, objects, or other groupings or encapsulations that differ from those shown in FIG. 2 without departing from the present invention as defined by the appended claims.

The automated document indexing system 136 receives a document 200 and attempts to "index" the document 200 for storage in the database 139 or for application to a particular workflow processing system 186. In this respect, the concept of "indexing" a document refers to the process of extracting indices from the document 200. According to embodiments of the present invention, indexing is performed automatically and manually when automated indexing fails.

In order to attempt an automated extraction of indices from the document 200, the automated document indexing system 136 includes a number of components such as, for example, an optical character recognition routine 203 and a classification predictor 206. The automated document indexing system 136 also includes a document indexing orchestrator 209 and a number of indexing entities 213. The document indexing orchestrator 209 directs the use of various indexing entities 213 in order to extract indices from a respective document 200, as will be described. The indexing entities 213 may comprise, for example, any one of a number of commercially available programs for extracting indices from a document 200 that employ technologies such as natural language processing, neural networks, Bayesian analysis, and other technologies. Alternatively, various ones of the indexing entities 213 may comprise a combination of two or more programs, as described above that are executed in succession to more effectively extract desired indices from a document 200.

The automated document indexing system 136 also includes a correcting indexing engine 219 and a number of reclassification entities 223. The document indexing orchestrator 209 further interfaces with the correcting indexing engine 219 and the reclassification entities 223 upon a failure of the indexing entities 213 to extract indices from a document 200 in final attempts to achieve the automated indexing of a document 200 before it is subject to manual indexing, as will be described.

The automated indexing system 136 also includes a manual indexing module 226 that is executed in order to facilitate a manual extraction of indices from the document 200 upon a failure to automatically extract the same indices by the document indexing orchestrator 209, the indexing entities 213, the correcting indexing engine 219, and the reclassification entities 223, as will be described. In addition, the document indexing orchestrator 209 communicates with the workflow processing system 186 providing indexed documents 200 thereto for processing according to the respective workflow of the workflow processing system 186, as will be described. Various components of the automated document indexing system 136 interface with the database 139 to obtain such information as is necessary to perform their functions, as will be described.

Figures 3, 4:
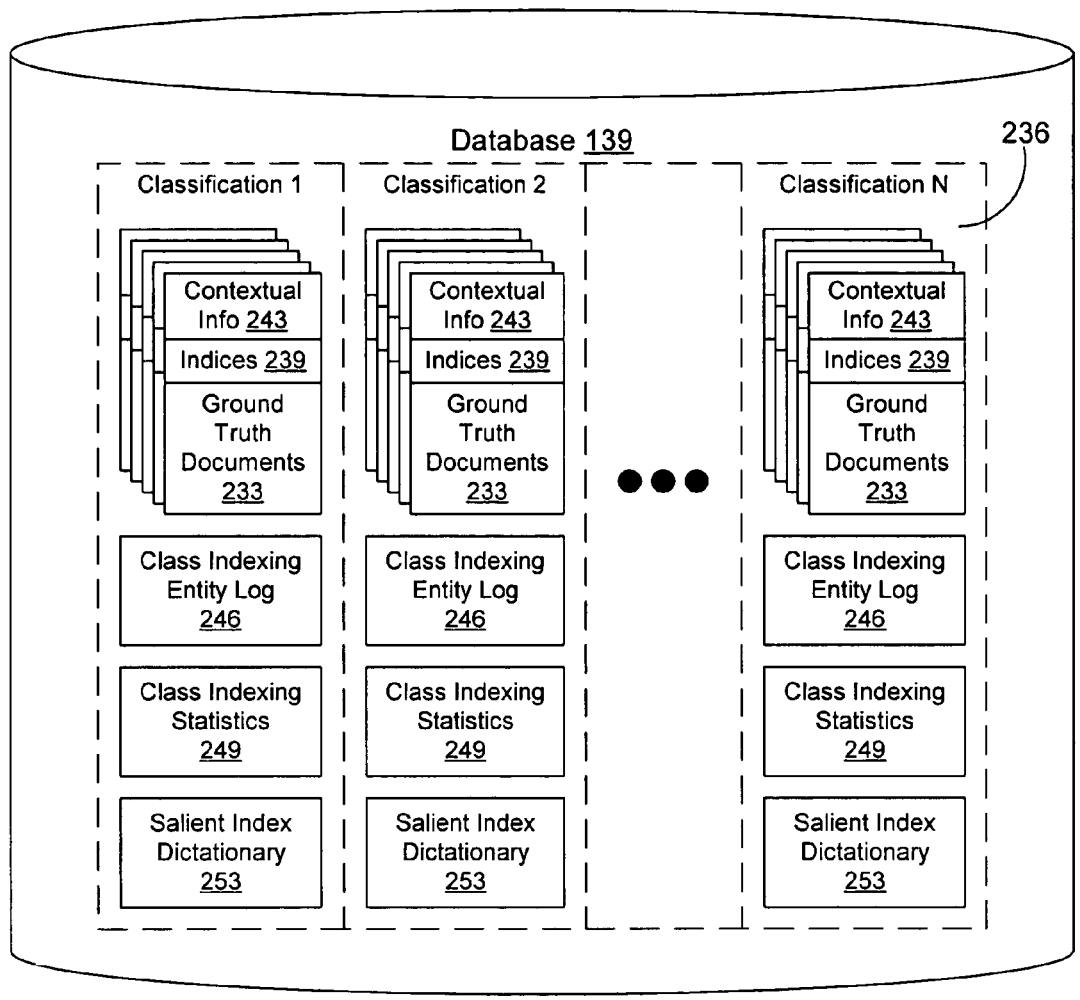
FIG. 3 is a block diagram of a database employed in the automated document indexing system of FIG. 2, according to an embodiment of the present invention.
FIG. 4 is a block diagram of class indexing statistics that are maintained in the database of FIG. 3, according to an embodiment of the present invention.

Turning then to FIG. 3, shown is an example of a database 139, according to an embodiment of the present invention. Stored within the database 139 are a number of ground truth documents 233 that are organized according to a number of classifications 236. Within a given classification 236, the ground truth documents 233 include similar characteristics or traits, as will be described. Associated with each of the ground truth documents 233 are indices 239 and contextual information 243. The indices 239 comprise data fields with corresponding values that may be employed to search for the ground truth documents 233 within the database 139. For example, one index may include a "Name" data field with a corresponding value of "John Doe". The indices 239 associated with each ground truth document 233 act as metadata that facilitates a search for each ground truth document 233 so that they may be retrieved at a later date in a speedy and economical manner.

The ground truth documents 233 are also referenced by the automated document indexing system 136 in the attempt to extract indices from newly scanned documents 200, as will be described. In this respect, as new documents 200 are scanned and ultimately stored in the database 139 as ground truth, the automated document indexing system 136 adapts to changes in documents 200 over time.

Associated with each of the classifications 236 is a class indexing entity log 246. The class indexing entity log 246 is employed to track the successes and failures of each of the indexing entities 213 in extracting indices from various documents 200 with respect to each of the classifications 236. In this respect, the class indexing entity logs 246 provide information from which statistics may be generated relative to the operation of each of the indexing entities 213 (FIG. 2), as will be described.

Also, each of the classifications 236 includes class indexing statistics 249. Among the class indexing statistics 249 is, for example, the probability of success for each of the indexing entities 213 in extracting desired indices from documents 200 for each of the respective classifications 236. The class indexing statistics 249 also include other values, as will be described.

In addition, each classification 236 features a salient index dictionary 253. The salient index dictionaries 253 list desired indices that the automated document indexing system 136 is to attempt to extract from documents 200 for each respective classification 236, as will be described. In addition, other information may be stored in the database 139 for each of the classifications 236 and for other purposes, as will be described in the text that follows.

With reference to FIG. 4, shown is a block diagram that illustrates an example of the class indexing statistics 249 that are associated with each of the classifications 236 (FIG. 3) according to an embodiment of the present invention. For each of the classifications 236, stored within the class indexing statistics 246 are percent confidences 263 for each of the indexing entities 213, the correcting indexing engine 219, and the reclassification entities 223.

Other information that may be maintained within the class indexing statistics 249 includes processing time per page 266 for each of the indexing entities 213. The class indexing statistics may also include a cost per use 269 for each respective indexing entity 213 for those situations in which the use of various indexing entities 213 may be subject to a license agreement, etc. In addition, other information may be maintained within the class indexing statistics 246 that is used in conjunction with the operation of the automated document indexing system 136, as will be described.

Referring back to FIG. 2, next the general operation of the automated document indexing system 136 is described, according to various embodiments of the present invention. To begin, a hard copy document is scanned into digital form by the scanner 103 (FIG. 1), thereby creating document 200. In addition, any contextual information 273 that is generated by the scanner 103 when the document 200 is scanned is associated with the document 200. The contextual information 273 may comprise, for example, a name of a user that scanned the document 200 using the scanner 103, a time at which the document 200 was scanned by the scanner 103, or other information, as can be appreciated. The contextual information 273 may be associated with the document 200 by including the contextual information 273 as metadata associated with the document 200, or the contextual information 273 may be associated with the document 200 in some other manner, as can be appreciated.

Once scanned into digital form, the document 200 is first applied to the optical character recognition (OCR) module 203 in order to convert any text in the document 200 that is represented in image format into recognizable text as can be appreciated. Thereafter, the document 200 is applied to the classification predictor 206 in order to identify which one of the classifications 236 (FIG. 3) with which the document 200 appears to be most closely aligned or associated. In this respect, the classification predictor 206 initially classifies the document 200 as belonging to a respective one of the classifications 236. In this respect, an association is drawn between a document 200 to be indexed and one of the classifications 236.

In addition, the classification predictor 206 generates a list of classifications 236 that are arranged in a predefined order based upon the likelihood that the document 200 falls within such classifications 236. Specifically, the more likely the document 200 is properly classified in a given classification 236, the higher the priority assigned to the classification 236 in the list. Initially, the document 200 is classified as belonging to the highest priority classification 236 on the list.

The document 200 is classified in this manner as the classification 236 associated with the document 200 provides a context for the operation of the various indexing entities 213, the correcting indexing engine 219, and the reclassification entities 223, as will be described. In order to determine the initial classification of the document 200, the classification predictor 206 may employ winnowing algorithms to identify specific ground truth documents 233 in the database 139 with which the document 200 has like characteristics. Alternatively, the classification predictor 206 may also employ predefined rules to classify the document 200 based upon the contextual information 273 associated with the document 200. For example, one rule may dictate that all documents 200 scanned by a particular person are to be classified according to a particular one of the classifications 236. Specifically, for example, if a user is a billing clerk, then it may be assumed that any documents they scan into the system are invoices to be stored in the database 139, etc. As such, a classification 236 is created in the database 139 for the storage of invoices that is automatically assigned to the document 200 for further processing by the automated document indexing system 136.

Once the document 200 is initially classified by the classification predictor 206, then the document 200 is applied to the document indexing orchestrator 209. Thereafter, the document indexing orchestrator 209 applies the document 200 to one or more of the indexing entities 213 in an attempt to extract indices 239 from the document 200. As described above, the indices 239 comprise fields with corresponding values that are associated with the document 200 and that facilitate a searching for the document when the document is stored in the database 139 as one of the ground truth documents 233. In addition, the information associated with the indices 239 may be employed in a workflow process. In order to determine which of the indexing entities 213 are to be employed in an attempt to extract the desired indices from the document 200, the document indexing orchestrator 209 employs various algorithms, as will be described.

In addition, it may be the case that the document indexing orchestrator 209 applies the document 200 to multiple ones of the indexing entities 213 in an attempt to extract the indices from the document 200. Where each of the indexing entities 213 fail to successfully extract all of the desired indices on an individual basis for a given classification 236, then the document indexing orchestrator 209 may generate a composite group of indices from the sets of indices that were successfully extracted by the indexing entities 213. Specifically, each classification 236 includes a number of predefined indices stored in the respective salient index dictionaries 253 that are to be extracted from the documents 200 that are so classified.

The determination as to whether any one of the indexing entities 213 is able to successfully index the document 200 depends upon whether the indexing entities 213 are able to successfully extract at least a minimum number of the indices indicated in the salient index dictionary 253 for the respective classification for which the document 200 is classified. In situations where instantiations of multiple ones of the indexing entities 213 are able to extract a lesser number of indices than the minimum required for a given classification 236, the document indexing orchestrator 209 employs various approaches to combine the indices that were extracted by the individual indexing entities 213 into the composite set of indices, as will be described. Examples of specific approaches that may be employed to compile the composite set of indices may comprise voting, weighting voting, and using a confusion matrix, as will be described.

Assuming that the document indexing orchestrator 209 was able to obtain the minimum required indices for the respective document 200 based upon a given classification 236, then the document indexing orchestrator 209 may automatically apply the document 200 to a workflow processing system 186 for further processing based upon a predefined workflow. In doing so, the set of indices 239 that were extracted from the document 200 may be associated with the document 200 by placement in an appropriate header or other data structure associated with the document 200.

The workflow processing system 186 may employ the values associated with the indices 239 to perform a predefined workflow. For example, the workflow processing system 186 may comprise a bank loan approval system. Various ones of the indices 239 may comprise, for example, the name of a lender, a loan amount, and other information pertinent to obtain to the approval of a loan. The workflow processing system 186 may then proceed to automatically determine whether the loan is approved based upon predefined criteria. If the document 200 has been incorrectly classified 236 and/or the specific indices 239 associated with the document 200 are not those expected by the workflow processing system 186, then the workflow processing system returns the document 200 back to the document indexing orchestrator 209 for reclassification in order to perform further attempts to extract indices from the document 200, as will be described.

Assuming, however, that the document indexing orchestrator 209 was unable to obtain the required minimum number of indices, as set forth in the respective salient index dictionary 253, then the document indexing orchestrator 209 applies the document 200 to the correcting indexing engine 219. The correcting indexing engine 219 employs various algorithms to correct any potential errors made by the optical character recognition module 203 based upon the current classification 236 associated with the document 200. In particular, the correcting indexing engine 219 searches for anticipated errors on the part of the OCR module 203 that were made based upon the indices stored in the respective salient index dictionary 253 for the current classification 236 of the document 200, as will be described.

After any corrections made by the correcting indexing engine 219, the correcting indexing engine 219 attempts to extract the desired indices stored in the salient index dictionary 253 of the respective classification 236. If the correcting indexing engine 219 was successful in extracting the required minimum number of indices 239, then the document indexing orchestrator 209 applies the document 200 to the workflow processing system 186, as described above.

On the other hand, if the correcting indexing engine 219 was unable to extract the desired indices from the document 200, then the document indexing orchestrator 209 assumes that the current classification of the document 200 was incorrect. In such case, the document indexing orchestrator 209 applies the document 200 to one or more of the reclassification entities 223 in an attempt to properly reclassify the document 200 as belonging to another one of the classifications 236. In this respect, the reclassification entities 223 may each employ various algorithms, as will be described. Each of these algorithms is an approach by which associations are drawn between the document 200 and at least one of the ground truth documents 233.

Once the reclassification is completed, then the document indexing orchestrator 209 applies the reclassified document 200 to the indexing entities 213 once more in an attempt to extract the indices from the document 200 based upon the new salient index dictionary 253 associated with the new classification 236. In this respect, the document indexing orchestrator 209 once again proceeds through the entire process as described above with respect to the new classification 236 in attempts to properly index the document 200. In this manner, the document indexing orchestrator 209 may repeatedly attempt to facilitate the extraction of the desired indices from the document 200 as classified under each possible classification 236 until the indices 239 are successfully extracted or until the extraction of indices 239 is completely unsuccessful.

Assuming that index extraction has been completely unsuccessful for the document 200 with respect to each one of the classifications 236, then the document indexing orchestrator 209 applies the document 200 to the manual indexing module 226 to facilitate a manual extraction of indices 239. In this respect, the document indexing orchestrator 209 places the document 200 in a manual queue to be accessed by the manual indexing module 226 to facilitate the manual extraction of the indices from the document 200.

During the course of the automated indexing operation on the part of the document indexing orchestrator 209, the document indexing orchestrator 209 may be directed to select various ones of the indexing entities 213 for index extraction based on restraints specified by a user. Specifically, limits on costs and time may be specified for the operation of the various indexing entities 213 that limits the ability of the document indexing orchestrator 209 to employ specific ones of the indexing entities 213 in attempts to extract the desired indices therefrom as will be discussed. Alternatively, various indexing entities 213 might be off limits for index extraction except for predefined conditions specified by a system manager.

Figure 5:
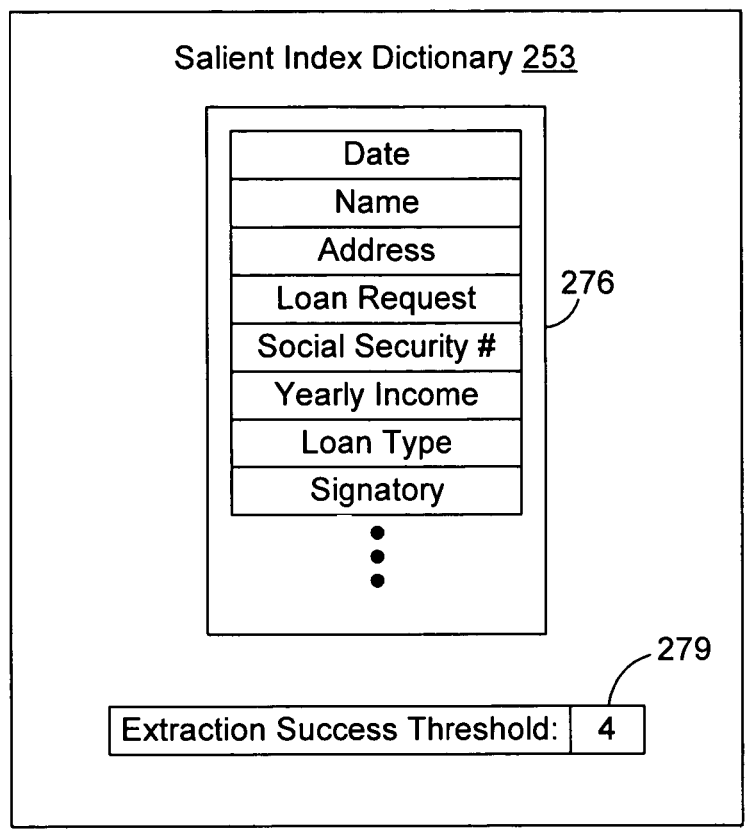
FIG. 5 is a block diagram of a salient index dictionary that is maintained in the database of FIG. 3, according to an embodiment of the present invention.

With reference to FIG. 5, shown is an example of a salient index dictionary 253 that is associated with each of the classifications 236. The salient index dictionary 253 includes a list of base classification indices 276, according to an embodiment of the present invention. The base classification indices 276 comprise a predefined group of indices that are specified, for example, by a system manager of the database 139 as being representative of the indices 239 (FIG. 3) that are generally associated with the ground truth documents 233 (FIG. 3) within a given one of the classifications 236. Alternatively, the base classification of indices 276 may be specified in some other manner. For a new document 200 to be indexed, the automated document indexing system 136 attempts to extract each of the base classification indices 276 from the document 200. The specific list of base classification indices 276 that are to be extracted depends upon the classification 236 of the document 200.

For example, assuming that a particular classification 236 included loan applications, then the base classification indices 276 may be fields that are expected to be extracted from a loan application. The automated document indexing system 136 attempts to automatically extract the base classification indices 276 from the document 200. However, for various reasons inherent in the automated extraction of indices from a document 200, it may be the case that only a predefined number of the total of base classification indices 276 can be successfully extracted from the document 200 at a given time. Consequently, according to an embodiment of the present invention, an automated extraction of indices 239 from a document 200 is deemed to be successful when a required subset of the base classification indices 276 that includes a minimum number of the base classification indices 276 for the given classification 236 is successfully extracted from the document 200.

In this respect, the salient index dictionary 253 also includes an extraction success threshold 279. The extraction success threshold 279 indicates the minimum number of the base classification indices 276 that must be extracted from a given document 200 in order to deem that the automatic extraction was successful. Alternatively, the extraction success threshold 279 may be a percentage rather than an integer number of indices, etc. In addition, various ones of the base classification indices 276 may be designated as mandatory indices that must be extracted from a document 200 in order to deem an automated extraction successful. This may be indicated by marking the data that represents the mandatory base classification indices 276 in the respective salient index dictionary 253.

Other ones of the base classification indices 276 may not deemed mandatory for successful automated extraction of indices 239. Thus, for purposes of the discussion herein, a "required subset of indices" is defined herein as the minimum required number of the base classification indices 276 that must be extracted from a document 200 in order for an automated extraction of the indices to be deemed successful. For a given classification 236, the required subset of indices may or may not include mandatory base classification indices 276. To provide one example, assume that a given classification 236 includes loan applications. As such the base classification indices 276 stored in the respective salient index dictionary 253 might include the following indices: Name, Address, Case Number, Agent, Salary, Requested Amount, and Credit Rating. Assume also that the system administrator has deemed that only 3 of the above indices need to be extracted in order to properly assign the document 200 to a respective workflow processing system 186. Of the three required indices, the Name and Case Number may be deemed mandatory. Consequently, the required subset of indices that must be extracted from the document 200 may be "Name, Case Number, and Agent". Alternatively, in this group, the "Agent" may be replaced with some other index.

With reference to FIGS. 6A-6G, 7, and 8A-8C, shown are examples of flow charts of various components of the automated document indexing system 136, according various embodiments of the present invention. Alternatively, each of the flow charts of FIGS. 6A-6G, 7, and 8A-8C may be viewed as depicting steps of example methods implemented in the document indexing server 106 and the workflow processor 116. The functionality of the automated document indexing system 136 as depicted by the example flow charts of 6A-6G, 7, and 8A-8C may be implemented, for example, in an object oriented design or in some other programming architecture. Assuming the functionality is implemented in an object oriented design, then each block represents functionality that may be implemented in one or more methods that are encapsulated in one or more objects. The automated document indexing system 136 may be implemented using any one of a number of programming languages such as, for example, C, C++, C#, Visual Basic, JAVA, Perl, Python, or other programming languages.

Figure 6A:
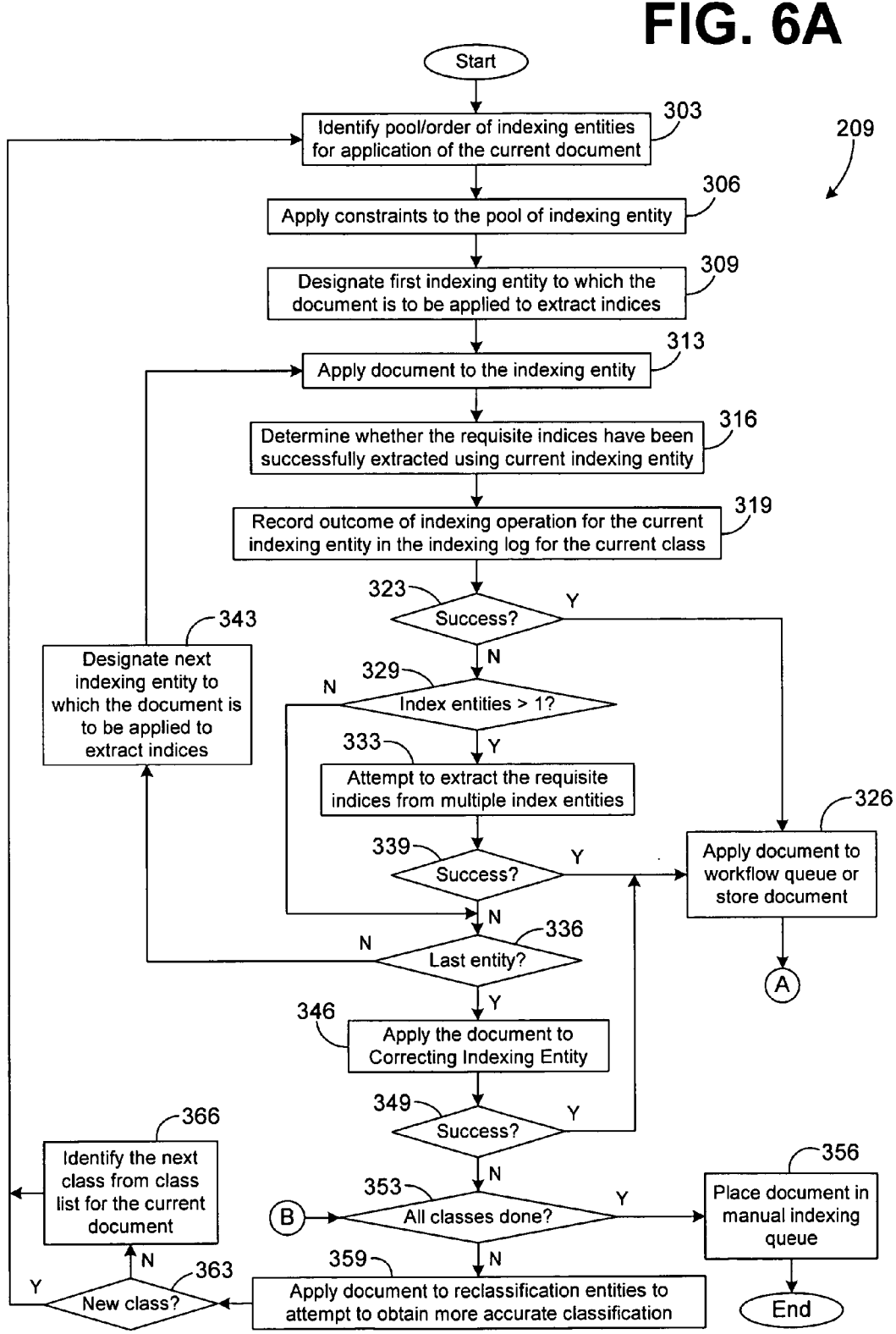

With specific reference to FIG. 6A, shown is a flow chart that depicts one example of the operation of the document indexing orchestrator 209. Beginning with box 303, the document indexing orchestrator 209 first identifies a pool of indexing entities 213 (FIG. 2) that are to be employed in an attempt at automated index extraction with respect to the document 200 (FIG. 2). Specifically, the document 200 is applied to predefined ones of the indexing entities 213 in order to attempt to extract the required subset of indices 239 (FIG. 3) from the document 200 based upon the respective base classification indices 276 (FIG. 5) associated with the respective classification 236 (FIG. 3) within which the document 200 is currently classified.

In order to identify the pool of indexing entities 213 that may be employed for index extraction with respect to the document 200, various approaches may be employed. In one approach, a predictive selection is specified. Specifically, the indexing entities 213 are selected only if they have a percent confidence 263 (FIG. 4) as specified in the class indexing statistics 246 (FIG. 4) of the respective classification 236 (FIG. 3) that exceeds a threshold percent confidence specified by the user. Alternatively, the pool of indexing entities that is identified for use may be placed in an order for designation of use, according to the percent confidences associated with each indexing entity 213. As an additional alternative, a known sequence of indexing entities 213 may be included in the class indexing statistics 246 that is employed based upon the classification 236 of the document 200.

Assuming that the pool of indexing entities 213 are identified for processing the document 200, then in box 306 the document indexing orchestrator 209 applies any constraints specified by a user to the pool of indexing entities 213 identified in box 303. Such constraints may be, for example, not to use certain ones of the indexing entities 213 for various reasons. Such reasons may be, for example, that only indexing entities 213 having a percent confidence 263 above a predefined threshold percent confidence are to be used, that only indexing entities 213 can be employed that can perform the indexing function within a predefined amount of time per page 266 (FIG. 4), or that only indexing entities 213 may be employed that have a cost below a predefined cost per use 269 (FIG. 4).

Also, the order within which the indexing entities 213 are employed may be altered as specified by a user. For example, the user may specify that more expensive indexing entities 213 should be used last, or that the indexing entity(ies) 213 that has(have) long processing times per page be used last, etc. In addition, other restraints may be placed upon the use of the indexing entities 213.

Assuming that any and all constraints are applied to the pool of indexing entities 213 in box 306, then in box 309 the document indexing orchestrator 209 designates a first one of the indexing entities 213 to which the document 200 is to be applied in an attempt to extract the desired indices 239 therefrom. Alternatively, multiple indexing entities 213 may be selected to extract the desired indices 239 from the document 200, where the multiple indexing entities 213 operate in parallel where, for example, it is unlikely that a first one of the indexing entities 213 would succeed in extracting the required subset of indices 239 itself, etc. Next, in box 313, the document 200 is applied to the indexing entity(ies) 213 designated for operation. The respective indexing entity(ies) 213 then attempts to extract a set of indices from the document 200 that comprises at least the required subset of indices for the respective classification 236, as described above.

In block 316, the document indexing orchestrator 209 determines whether the required number of indices specified in the respective salient index dictionary 253 have been successfully extracted from the document 200 using the current indexing entity 213. Thereafter, in box 319 the document indexing orchestrator 209 records whether the extraction performed by the current indexing entity 213 was successful in the class indexing entity log 246 (FIG. 3) associated with the respective classification 236 under which the document 200 is currently classified. This information can thus be used to maintain the percent confidences 263 for the respective indexing entities 213 for each classification 236.

Next, in box 323, if the attempt to extract the requisite number of indices from the document 200 was successful, then the document indexing orchestrator 209 proceeds to box 326. Otherwise, the document indexing orchestrator 209 progresses to box 329. In box 326, the document 200 and the extracted indices 239 are applied to the workflow processing system 186 for processing according to a predefined workflow as described above. In this respect, the document 200 may be placed in an appropriate queue associated with the workflow processing system 186 so that the document 200 may be accessed thereby at a later time. Thereafter, the operation of the document indexing orchestrator 209 proceeds to connector A as shown.

In box 329, the document indexing orchestrator 209 determines whether more than one of the indexing entities 213 has been employed in an attempt to extract the desired indices from the document 200. If so, then the document indexing orchestrator 209 proceeds to box 333. Otherwise, the document indexing orchestrator 209 proceeds to box 336.

In box 333, the document indexing orchestrator 209 attempts to extract the required subset of indices for the current classification 236 from the sets of indices extracted by the multiple indexing entities 213. That is to say, even if an indexing entity 213 was unsuccessful in the attempt to extract the required subset of indices, the indexing entity 213 may have succeeded in extracting a lesser or "incomplete" set of the base classification indices 276. Thus, even though each of the sets of indices that were extracted by the multiple indexing entities 213 are inadequate on an individual basis, it may be possible to combine them into a composite set of indices that does qualify as the required subset of indices for the current classification 236.

In this respect, the document indexing orchestrator 209 attempts to obtain a composite set of indices from each of the "incomplete" sets of indices generated by the indexing entities 213. In this respect, a "composite" set of indices is defined herein as a set of indices that is generated from the extraction outputs of multiple ones of the indexing entities 213. In this respect, the select ones of the indices extracted by various ones of the indexing entities 213 are combined into the composite set of indices. Thus, if no individual indexing entity 213 is capable of extracting the required subset of indices as specified by the total group of indices in the respective salient index dictionary 253, then the document indexing orchestrator 209 attempts to combine the indices extracted by multiple ones of the indexing entities 213 in order to compile the subset of indices required for the extraction of indices to be successful.

In order to generate the composite set of indices from the sets of indices generated by each of the indexing entities 213, various approaches may be employed. These approaches include the use of voting, weighted voting, and the use of a confusion matrix as will be further described with respect to FIGS. 6B, 6C, and 6D.

Next, in box 339 if the composite set of indices is successfully compiled in box 333 such that the composite set of indices qualifies as the required subset of indices for the respective classification 236, then the document indexing orchestrator 209 proceeds to box 326 in which the document 200 along with the extracted indices are applied to the respective workflow processing system 186 in box 326. However, if the composite set of indices could not be successfully compiled as determined in box 339, then the document indexing orchestrator 209 proceeds to box 336.

In box 336, the document indexing orchestrator 209 determines whether the last indexing entity 213 has been employed, whether serially or in parallel, in attempts to extract the desired indices from the document 200. This inquiry takes into account any restraints imposed upon the use of various available indexing entities 213 in box 306, described above. If there are indexing entities 213 that remain which may be employed, then the document indexing orchestrator 209 proceeds to box 343. Otherwise, the document indexing orchestrator 209 proceeds to box 346.

Assuming that document indexing orchestrator 209 has proceeded to box 343, then the next one or more of the next indexing entities 213 is designated to be employed in an attempt to extract the required subset of indices from the document 200. Thereafter, the document indexing orchestrator 209 reverts back to box 313. In this respect, assuming that no one of the indexing entities 213 successfully extracts the required subset of indices from the document 200, then multiple sets of indices will have been generated by multiple ones of the indexing entities 213 In their attempts to do so. Consequently, even though no one of the indexing entities 213 is capable of extracting the desired indices from the document 200, the document indexing orchestrator 209 may still attempt to compile the composite set of indices from those indices that the indexing entities 213 were in fact able to extract as described above.

Assuming that the document indexing orchestrator 209 proceeds to box 346 as the last indexing entity 213 had been used in an attempt to extract the required indices from the document 200, then in box 346 the document indexing orchestrator 209 applies the documents to the correcting indexing engine 219 in an attempt to once again extract the required subset of indices from the document 200. In this respect, the correcting indexing engine 219 will attempt to make corrections to the document 200 based upon the indices listed in the salient index dictionary 253. Specifically, the document 200 is searched for anticipated misspellings of the terms included in the salient index dictionary 253 for the respective classification 236. The operation of the correcting indexing engine 219 (FIG. 2) is described with reference FIG. 7.

Thereafter, in box 349, the document indexing orchestrator 209 determines whether the correcting indexing engine 219 was able to successfully extract the required subset of indices from the document 200. If so then the document indexing orchestrator 209 proceeds to box 326 in order to apply the document 200 to the appropriate workflow processing system 186. Otherwise, the document indexing orchestrator 209 proceeds to box 353.

In box 353, the document indexing orchestrator 209 determines whether the current document 200 has been classified in each one of the available classifications 236 in the multiple attempts to extract the required subset of indices from the document 200 for each respective classification 236. The index extraction is performed relative to each one of the classifications 236 in this manner as the salient index dictionary 253 varies for each classification 236. Thus, for each classification 236, the indexing entities 213 attempt to extract a different required subset of indices from the document 200. If index extraction has been attempted with respect to each one of the classifications 236 for the current document 200, then the document indexing orchestrator 209 proceeds to box 356. Otherwise, the document indexing orchestrator 209 moves to box 359.

In box 356, the document 200 is applied to a manual indexing queue where it will be accessed by the manual indexing module 226 to facilitate manual indexing of the document 200 by a user since all attempts at automated index extraction were unsuccessful. Thereafter, the operation of the document indexing orchestrator 209 with respect to the current document 200 ends.

However, assuming that the document indexing orchestrator 209 proceeds to box 359, then the document indexing orchestrator 209 applies the document 200 to one or more of the reclassification entities 223 in an attempt to obtain a more accurate classification of the document 200. This is because it is assumed that the previous classification of the document 200 was inaccurate as the attempted index extraction was unsuccessful. The operation of the individual reclassification entities 223 will be described with respect to FIGS. 8A-8C.

Next, in box 363, if the reclassification entities 223 were able to identify a new classification 236 of the document 200, then the document indexing orchestrator 209 reverts back to box 303. Otherwise, the document indexing orchestrator 209 proceeds to box 366 in which the next listed classification 236 is identified from the class priority list generated by the classification predictor 206 (FIG. 2), as described above. Thereafter, the document indexing orchestrator 209 reverts back to box 303 to begin the process anew with respect to the newly identified classification 236.

With reference to FIG. 6B, shown is a flowchart that further illustrates the operation of the document indexing orchestrator 209 with respect to box 333, denoted herein as routine 333a. In particular, described is a voting approach to obtain a composite set of indices from each of the incomplete sets of indices generated by the respective indexing entities 213. Beginning with box 373, a total number of times that each index 239 appears in all of the incomplete sets of indices generated by the respective indexing entities 213 is determined. Thereafter, the document indexing orchestrator 209 selects those indices out of the sets of indices that are to be included in the composite set of indices based upon the total number of times each of the respective indices appears in the sets of indices generated by the indexing entities 213. In this respect, a single vote is assessed for each time a particular index appears in the various sets of indices generated by the indexing entities 213. The composite set of indices is then constructed by including only those indices that have the highest number of votes or that have at least a predefined number of votes.

For example, assume that three sets of indices have been generated by three separate entities 213. Also assume that the minimum number of votes deemed necessary for the inclusion of a particular index into a composite set of indices is two. For each time that any one index appears in any of the three sets of indices extracted by the respective indexing entities 213, a single vote is assessed to the respective index. Thus, assuming that a particular index appears in all three of the sets of indices generated, then such an index would be included in the composite set of indices. Likewise, any index that appears in any two of the sets of indices would also be selected to be included in the composite set of indices. However, any index which appears in only one of the sets of indices would not be selected to be included in the composite set of indices since it does not have enough votes to be above the required threshold. In this manner, voting is employed to generate the composite set of indices.

Referring next to FIG. 6C, shown is a flowchart that further illustrates a weighted voting approach to generating the composite set of indices as set forth in box 333 (FIG. 6A) denoted herein as routine 333b. In this respect, the weighted voting approach is similar to that described with respect to FIG. 6B, however, each vote is weighted according to a weight associated with each of the indexing entities 213 employed to extract their respective set of indices. Thus, beginning with box 383, the document indexing orchestrator 209 associates a vote with each index in each of the sets of indices generated by a respective one of the indexing entities 213. Thereafter, in box 386 a weighted vote is generated for each index based upon the percent confidence 263 (FIG. 4) associated with the indexing entities 213 for the respective class that extracted the indices.

Next, in box 389, the weighted votes for each respective index are added to generate an aggregate or total weighted vote for each index that appears within the sets of indices generated by the corresponding indexing entities 213. Thereafter, the indices to be included in the composite set of indices are selected based upon the total weighted votes assessed for each index. Specifically, in one embodiment, only those indices will be included in the composite set of indices provided that their aggregate or total weighted vote is greater than a predefined threshold.

Referring next to FIG. 6D, shown is an additional flowchart that further describes another approach to determining those indices that should be included in a composite set of indices based upon the sets of indices generated by the individual indexing entities 213 as set forth in box 333 (FIG. 6A) denoted herein as routine 333c.

As described in FIG. 6D, shown is an approach that employs a confusion matrix to determine which ones of the indices generated by a respective indexing entities 213 as to be included in the composite set of indices. To explain further, as described above, assigned to each of the indexing entities 213 for each classification 236 is a percent confidence 263 (FIG. 4) that the indexing entity 213 itself will successfully extract the required subset of indices from a given document 200. In addition, the indexing entities 213 may include the capability of assigning a percent confidence to each index that they extract from a respective document 200, the percent confidence assigned to each index indicating the probability that the index itself is in fact one of the base classification indices 276, as set forth in the respect salient index dictionary 253 of the current classification 236. The percent confidence associated with each indexing entity 213, as set forth in the respective class indexing statistics 246, is described herein as the "entity confidence". The percent confidence assigned to individual indices by their respective extracting indexing entities 213 is termed herein as an "index confidence".

Thus, in box 396, a confidence score is calculated for each index where the confidence score=(entity confidence)(index confidence). Thereafter, in box 399 select ones of each of the indices that occur in each set of indices generated by the respective indexing entities 213 are included in the composite set of indices based upon the confidence score for each index. For example, only those indices may be selected that include a confidence score that is greater than a predefined threshold. Alternatively, only a predefined number of indices may be selected having the highest confidence scores.

Figure 6E:
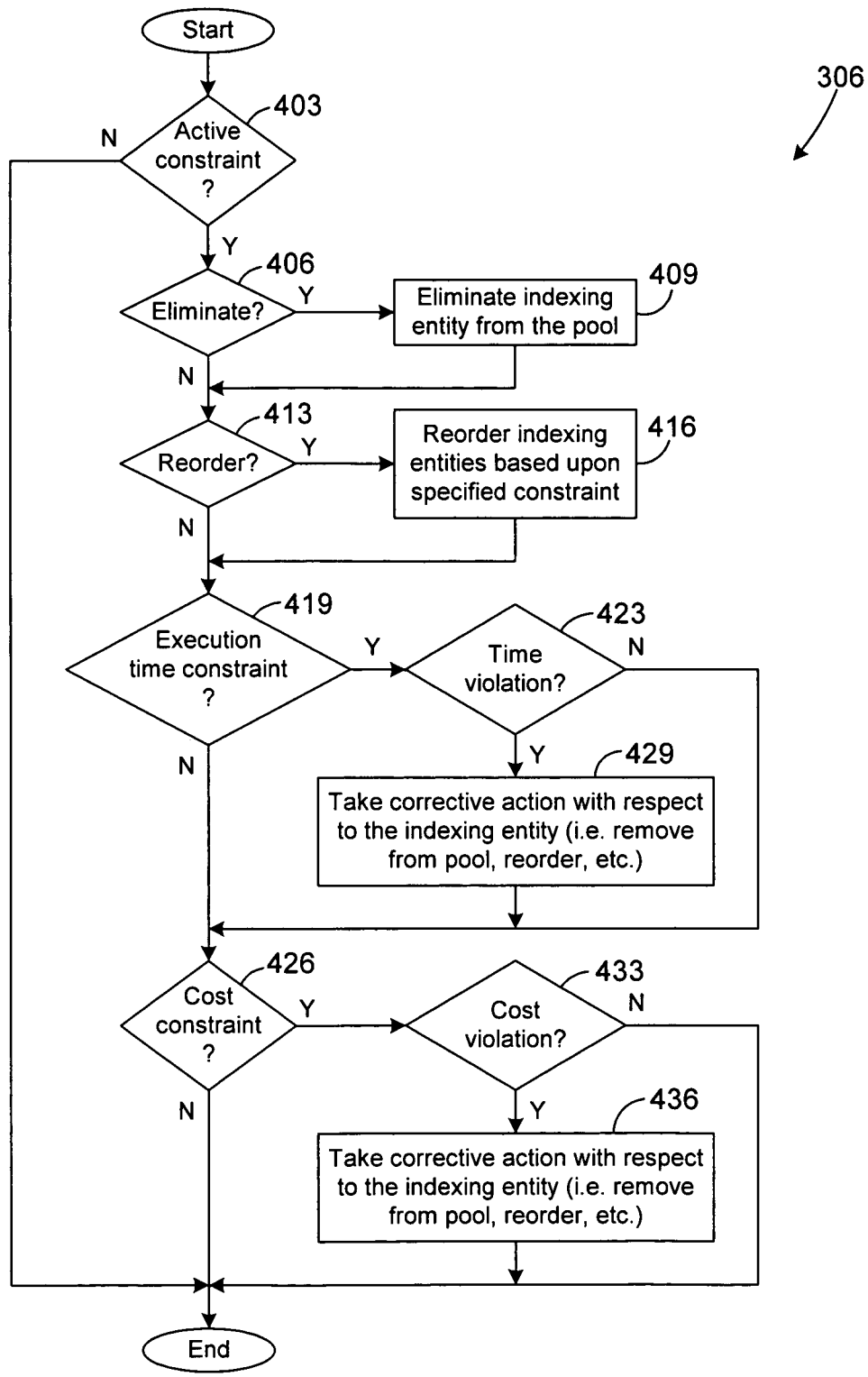

With reference to FIG. 6E, shown is a flowchart that further illustrates the operation of the document indexing orchestrator 209 as it relates to block 306 (FIG. 6A) in applying various constraints to the potential pool of indexing entities 213 that may be employed to extract the required subset of indices from the document 170 (FIG. 2) that has been classified according to a given classification 236 (FIG. 3). In particular, as set forth in FIG. 6E, the document indexing orchestrator 209 applies various constraints to the use of identified indexing entities 213 based upon criteria specified by a user. In this respect, the automated document indexing system 136 (FIG. 2) may generate appropriate user interfaces that facilitate the entering of constraints that are used to constrain the pool of indexing entities 213 that are employed to extract indices from a given document 200. Alternatively, the constraints may be determined automatically according to one or more algorithms executed in the document indexing server 106 (FIG. 1), etc.

Beginning with box 405, the document indexing orchestrator 209 determines whether an active constraint exists as having been entered by a user for the constraining of the operation of various indexing entities 213. Such a constraint may be, for example, preventing the use of any indexing entity 213 for index extraction that exceeds a certain cost or time constraint, etc. Alternatively, a user may specify that various indexing entities 213 are to be used according to a predefined order. For example, a user may require that certain indexing entities 213 have little or no cost associated therewith are to be used before indexing entities that have a cost associated with their use, etc. In addition, a user may dictate that certain indexing entities 213 are not to be used at all from time to time.

Thus, in box 403, if an active constraint exists, then the document indexing orchestrator 209 proceeds to box 406 in which it is determined whether a user has specified that certain ones of the indexing entities 213 are not to be used to extract indices from a given document 200. Such indexing entities 213 must be eliminated from the pool of indexing entities 213 identified in box 303 (FIG. 6A) for consideration in use to extract indices from the document 200. Assuming that indexing entities are to be removed in box 406, then the document indexing orchestrator 209 proceeds to box 409. Otherwise, the document indexing orchestrator 209 proceeds to box 413. In box 409, the respective indexing entities 213 are removed from the pool of possible indexing entities 213 to be used to extract indices from the document 200. Thereafter the document indexing orchestrator 209 proceeds to box 413.

In box 413, the document indexing orchestrator 209 determines whether the list that includes the pool of indexing entities 213 to be employed to extract indices from the document 200 is to be reordered according to a predefined priority. Such may be the case, for example, if the user specifies certain indexing entities 213 are to be used last or at least after other indexing entities 213 that may involve a lesser cost of use or a lesser processing time. Assuming that the list of indexing entities 213 is to be reordered in some manner, then the document indexing orchestrator 209 proceeds to box 416. Otherwise, the document indexing orchestrator 209 progresses to box 419. In 416, the order of execution of the indexing entities 213 is reordered according to the constraints specified. Thereafter, the document indexing orchestrator 209 proceeds to box 419. The order that is imposed upon the use of the indexing entities 213 determines which of the indexing entities 213 is designated for operation in boxes 309 and 343 (FIG. 6A) as can be appreciated.

In box 419, the document indexing orchestrator 209 determines whether a user has specified a particular time constraint that must be met by each of the indexing entities 213 in the course of their extraction of the indices from the respective document 200. In particular, the timing constraint may specify a maximum amount of time within which each indexing entity 213 must complete the operation of extraction of the indices per page, etc. If a timing constraint has been specified in box 419, then the document indexing orchestrator 209 proceeds to box 423. Otherwise, the document index orchestrator 209 proceeds to box 426.

In box 423, the document indexing orchestrator 209 determines whether there is a violation of a particular time constraint specified on the part of any one of the indexing entities 213. If not, then the document indexing orchestrator 209 proceeds to box 426. However, if there is a time violation as detected in box 423, then the document indexing orchestrator 209 proceeds to box 429 in which corrective action is taken with respect to the indexing entity 213 for which the violation occurs. Specifically, the respective indexing entity 213 may be removed from the possible indexing entities 213 to be used for index extraction or the priority of the indexing entities 213 in being designated for index extraction may be shifted or reordered, etc. Once the corrective action is taken in box 429, then the document indexing orchestrator 209 proceeds to box 426.

In box 426, the document indexing orchestrator 209 determines whether a cost constraint exists with respect to each of the indexing entities 213. If such is the case, then the document indexing orchestrator 209 proceeds to box 433. Otherwise, the document indexing orchestrator 209 ends as shown. Assuming a cost constraint exists in box 423, then in box 433, the document indexing orchestrator 209 determines whether the time of operation of any one of the indexing entities 213 selected for index extraction violates the cost constraint. If such is the case then the document indexing orchestrator 209 proceeds to box 436. Otherwise, this routine of the document indexing orchestrator 209 ends. In box 436, the document indexing orchestrator 209 takes corrective action with respect to the indexing entities 213 for which a cost constraint is violated. Specifically, such indexing entities may be removed from operation or the order of designation of the various indexing entities 213 with respect to index extraction may be reordered accordingly, for example, where higher cost indexing entities are placed at the lowest priority designation. Thereafter, this routine of the document indexing orchestrator 209 ends.

Figure 6F:
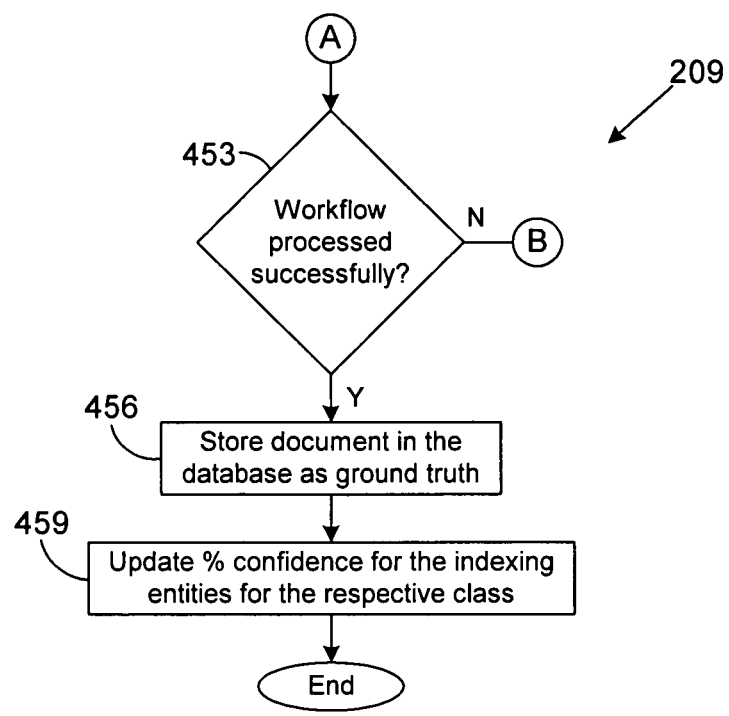

With respect to FIG. 6F, shown is a flowchart that represents a portion of the operation of the document indexing orchestrator 209 that continues from connector A (FIG. 6A). Beginning with box 453, the document indexing orchestrator 209 determines whether the workflow of the respective workflow processing system 186 was successfully executed given the indices extracted from the document 200. This determination is made based upon a success or failure indication supplied by the workflow processing system 186 with respect to the document 200.

For example, the workflow processing system 186 may have been executed to determine whether a loan application is approved or rejected. The workflow processing system 186 operates upon the extracted indices associated with the given document 200 from the automated document indexing system 136 (FIG. 2) in order to make the determination as to whether the loan application is to be approved. In this respect, the extracted indices may comprise, for example, the name of the applicant, the yearly income of the applicant and other pertinent information. If, in fact, the indices needed to perform the workflow of the specified workflow processing system 186 were not extracted, then it is unlikely that the workflow will execute successfully.

If the document indexing orchestrator 209 determines that the workflow process was not successful in box 453, then the document indexing orchestrator 209 proceeds back to box 353 (FIG. 6A) through connector B. If the workflow was successfully executed, the document indexing orchestrator 209 progresses to box 456.

In box 456, the document indexing orchestrator 209 stores the document 200 in the database 139 (FIG. 3) as a ground truth document 233. Specifically, the document 200 is stored as a ground truth document 233 under the appropriate classification 236 that was specified so as to properly extract the indices 239 from the document 200. In storing the document 200 as one of the ground truth documents 233, the extracted indices 239 are also stored in association therewith. Also, any contextual information 243 is stored in association with the ground truth document 233. Next, in box 459, the percent confidence 263 of each of the indexing entities 213 for the respective classification 236 are updated in view of the successes and/or failures of the indexing entities 213 to properly extract the indices from the document 200 either individually or collectively, etc. Thereafter the document indexing orchestrator 209 ends.

By storing a document 200 that has been successfully processed by a workflow processing system 186 as a ground truth document, the automated document indexing system 136 thus incorporates an automated feedback mechanism that improves performance over time. Specifically, as the pool of ground truth documents grows, there are more documents for comparison with newly scanned documents as performed by various routines described herein.

Figure 6G:
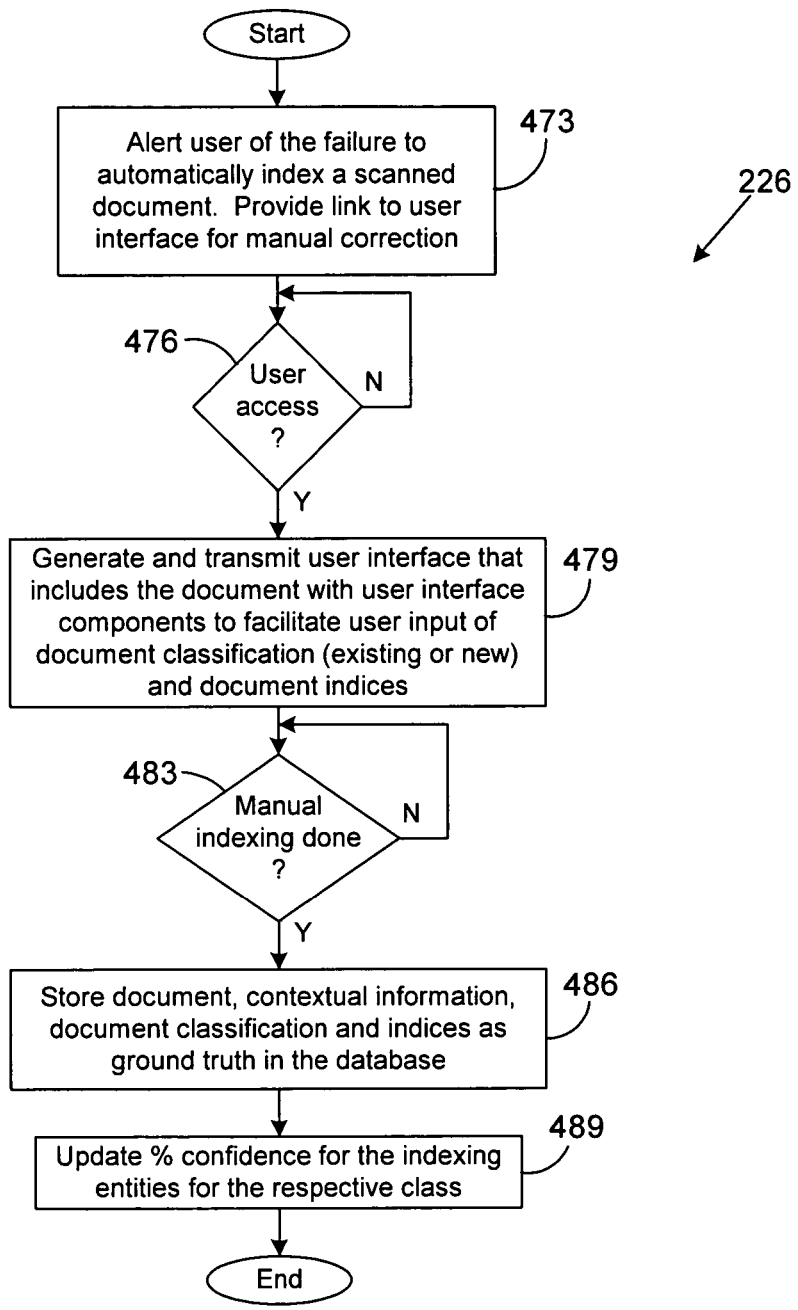

With respect to FIG. 6G, shown is a flowchart that illustrates one example of the manual indexing module 226, according to an embodiment of the present invention. The manual indexing module 226 is executed in order to facilitate a manual index extraction with respect to a document 200 for which automated index extraction failed. Beginning with box 473, the manual indexing module 226 alerts a user of a failure to automatically index a scanned document 200 by the automated document indexing system 136. This alert may be made in the form of an electronic mail message or other alert sent to the client 113 presumably operated by the user. In one embodiment, the message may include a link to a user interface for manual correction, wherein the user interface comprises, for example, a web page or other type of network graphical interface that is served up to a client 113 (FIG. 1) by the network server 143 (FIG. 1) of the document indexing server 106 (FIG. 1). The user may "click" onto the link to cause the automated execution of the browser 166 that generates and transmits a request to the network server 143 for the user interface, where the link specifies the location of the user interface on the network 109.

The user interface that is obtained provides for manual index extraction, as will be described. Assuming that the alert is provided to the user, then in box 476 the manual indexing module 226 waits until a user attempts to access the specific user interface by virtue of selecting the link in the appropriate email message, etc. Assuming that the client has requested the user interface in box 476, then in box 479 the manual indexing module 226 generates and transmits the user interface through the network server 143 (FIG. 1) to the particular client 113 that generated the request.

The user interface facilitates a user specification of the document indices 239 (FIG. 3) and appropriate classification 236 (FIG. 3) for the document 200. Specifically, the user interface may allow a user to highlight various portions of the document that include the index information, and/or the ability to enter such information on a keyboard, etc.

In box 483, the manual indexing module 226 waits to receive a reply from the client 113 that includes the user specification of the indices 239 within the document 200. In box 486, the document 200 is stored in the database 139 as one of the ground truth documents 233, as described above. In addition, the indices 239 that were manually extracted are stored in the database 139 in association with the ground truth document 233. The document 200 and the indices 239 are stored in the database 139 under the appropriate classification 236.

Thereafter, in box 489, the percent confidences 263 associated with the respective indexing entities 213 that attempted index extraction for the current document 200 are updated in the respective class indexing statistics 246 for the respective classification 236 manually identified. In this respect, each of the percent confidences 263 are updated to reflect the failure on the part of each one of the corresponding indexing entities 213 to properly extract the required subset of indices with respect to the manually identified classification 236.

It is understood that the flow chart of FIG. 6G provides one example of how manual index extraction may be accomplished. Alternatively, manual index extraction may be accomplished via other approaches as can be appreciated.

Figure 7:
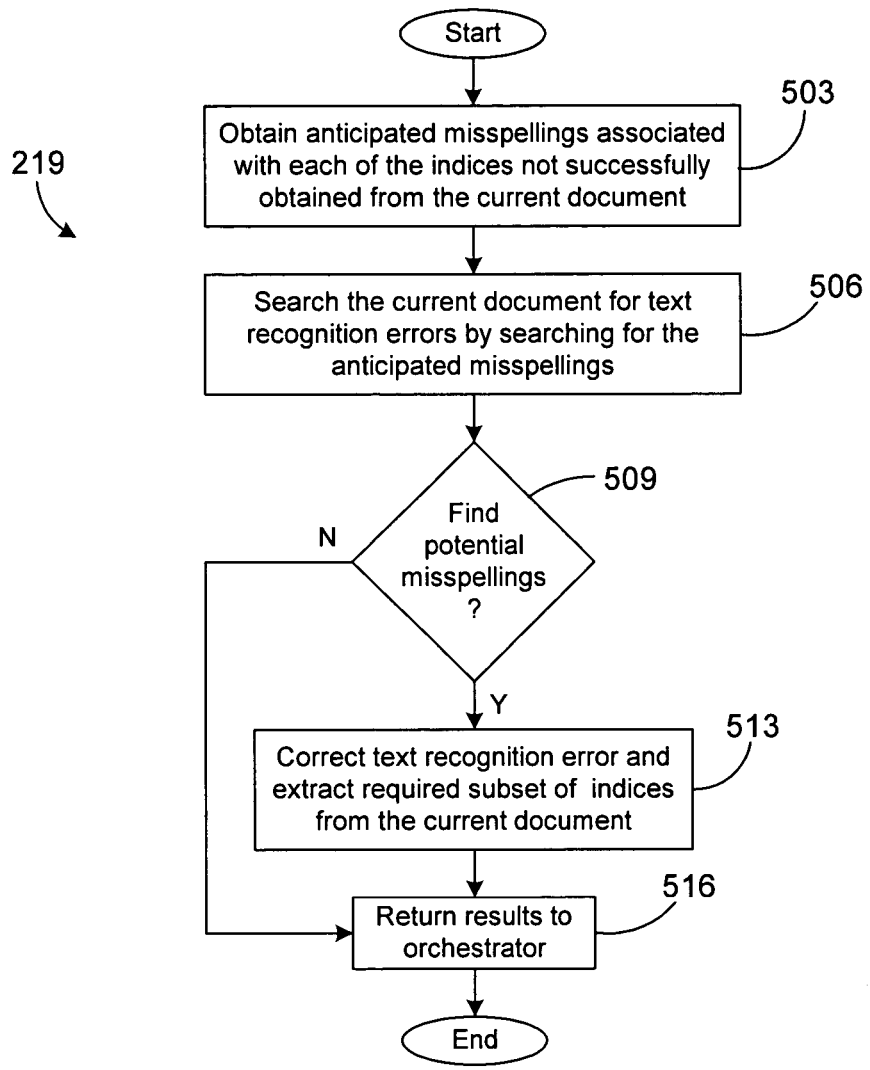
FIG. 7 is a flow chart that illustrates one example of the operation of a correcting indexing engine executed as a portion of the automated document indexing system of FIG. 2, according to an embodiment of the present invention.

Turning then to FIG. 7, shown is a flowchart of the correcting indexing engine 219, according to an embodiment of the present invention. The correcting indexing engine 219 is executed by the document indexing orchestrator 209 upon a failure of the indexing entities 213, either individually or collectively, to extract the required subset of indices from the document 200 for the current classification 236. In this respect, not only did each individual indexing entity 213 fail to extract the required subset of indices, but the document indexing orchestrator 209 was unable to create the composite set of indices from those indices that were extracted by the indexing entities 213. In view of this failure, the document indexing orchestrator 209 applies the document 200 to the correcting indexing engine 219 in an attempt to detect and correct any text recognition errors by searching the document 200 for anticipated misspellings associated with each of the base classification indices 276 (FIG. 5) in the salient index dictionary 253 of the respective classification 236.

Beginning with box 503, the correcting indexing engine 219 attempts to find any text recognition errors by searching for any anticipated misspellings associated with each of the base classification indices 276 that have not been extracted from the current document 200 by the indexing entities 213. The text recognition errors include the anticipated misspellings that typically occur due to the use of the optical character recognition after the document 200 was scanned, as described above. Such errors may typically include, for example, glyph errors or other errors frequently experienced by text recognition systems as can be appreciated by those with ordinary skill in the art. For example, the word "Client" may be recognized (and therefore misspelled) as "Chent". Also, the misspellings may be language processing errors where the word "Client" is recognized as the word "Pliant", etc. The anticipated misspellings are predefined by a system administrator and are stored, for example, in the salient index dictionary 253 of the respective classification 236.

Next, in box 506 the current document 200 is searched for the text recognition errors by searching for the anticipated misspellings. In box 509, if the correcting indexing engine 219 finds any one of the potential misspellings, then the correcting indexing engine 219 proceeds to box 513. Otherwise, the correcting indexing engine 219 progresses to box 516. Assuming that anticipated misspellings have been identified in box 509, then in box 513 the correcting indexing engine 219 makes corrections to the document 200 and makes a subsequent attempt to extract the required subset of indices including those indices that are now recognizable due to the corrections made from the document 200. Thereafter, the correcting indexing engine 219 proceeds to box 516. In box 516, the correcting indexing engine 219 returns the results to the document indexing orchestrator 209 which then reacts to determine whether the extraction of indices has resulted in the required subset of indices. Thereafter, the operation of the correcting indexing engine 219 ends with respect to the current document 200.

Figure 8A:
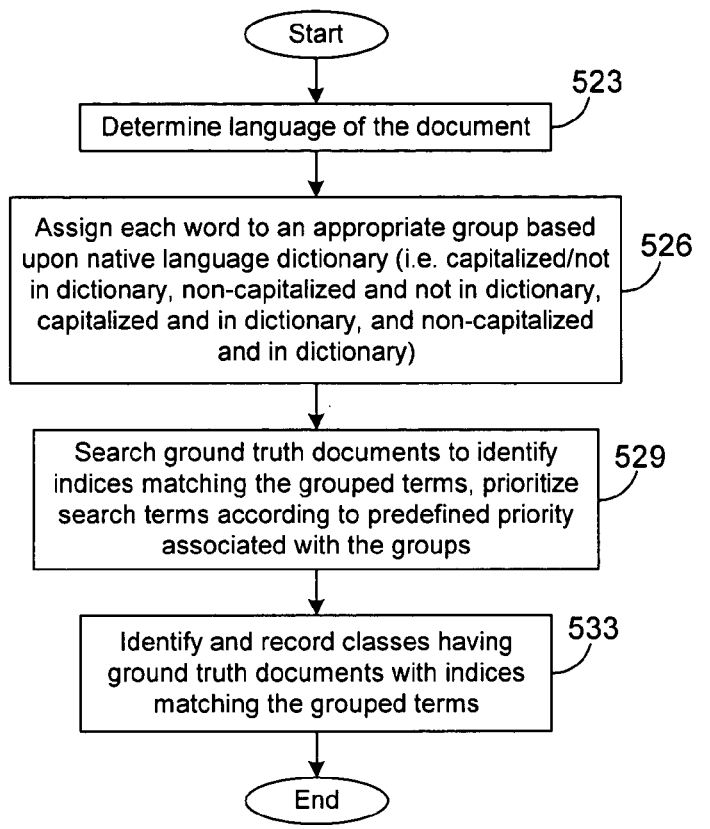
FIGS. 8A-8C are flow charts that illustrate examples of the operation of reclassification entities executed as a portion of the automated document indexing system of FIG. 2, according to an embodiment of the present invention.

With reference to FIG. 8A, shown is a flowchart that depicts one example of a reclassification entity 223, according to an embodiment of the present invention. The reclassification entity 223 is one of many reclassification entities 223 that are employed to reclassify the document 200 upon a failure of the correcting indexing entity 223 to extract the required subset of indices. The reclassification entity 223 depicted in FIG. 8A employs a native language dictionary associated with the native language depicted within the document 200 in order to obtain putative indices that are employed to search the indices 239 of ground truth documents in the database 139 (FIG. 3) to find a match therebetween. The classification 236 of any ground truth document 233 having indices 239 that match the putative indices is assumed to be a possible classification of the document 200.

Beginning with box 523, the reclassification entity 223 first determines the language of the document 200. In this respect, many different algorithms may be employed to determine the language of the document, as can be appreciated by those with ordinary skill in the art. Consequently such algorithms are not discussed herein in detail.

Once the language of the document 200 is determined in box 523, then in box 526, each word that appears in the document 200 is assigned to one of a number of predefined groups that are created based upon characteristics of the language depicted in the native language dictionary. In this respect, each term in the document is organized according to the groups. For example, such groups may comprise, for example, words that are capitalized that do not appear in the dictionary, words that are not capitalized that do not appear in the dictionary, words that are capitalized and that appear in the dictionary, and, words that are not capitalized and appear in the dictionary.

The particular groupings are predefined by a user based upon known information about the native language. For example, the cited example above in which capitalized letters that do not appear in a dictionary are formed in a specific group reflects the fact that such words typically may comprise names of individuals that may be of interest and that may have appeared in previous documents stored as ground truth documents 233 (FIG. 3). Likewise, words that are not capitalized but do not appear in the dictionary may reflect unique words associated with the matter of the document that are of interest.

Each of the groups specified is assigned a predefined priority. For example, words that are capitalized and do not appear in the dictionary may be assigned a high priority since such words may be of unique significance, whereas non-capitalized words that are in the dictionary may be of lesser significance. Next, in box 529, the words that have been placed in the various groupings are used to search the indices 239 associated with the ground truth documents 233 (FIG. 3) for matches therebetween. In this respect, the terms searched are searched according to a priority associated with the groupings identified in box 526. Thus, the groups may be considered to be search priority groups. The priority of terms searched within each grouping may be determined, for example, at random or based on some set of criteria, etc. The terms used for searching may be considered "putative indices".

Thereafter, in box 533, the reclassification entity 223 identifies and records any classes having ground truth documents 233 with indices 239 that match the putative indices searched above in box 529. Thereafter, the reclassification entity 223 provides the results to the document indexing orchestrator 209 which then makes a decision as to how to reclassify the document 200 in view of the alignment of the document 200 with respective classifications based upon the results of the reclassification entity 223. Thereafter, the reclassification entity 223 ends.

Figure 8B:
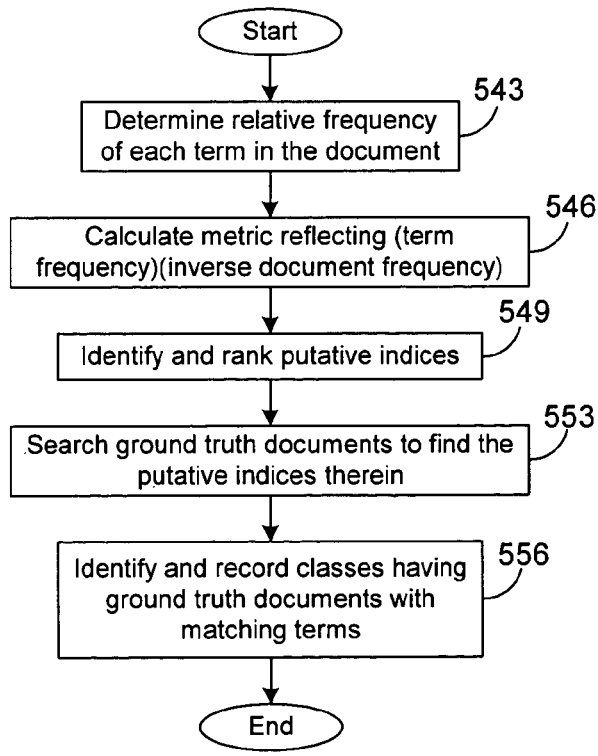

Turning then to FIG. 8B, shown is another example of the reclassification entities 223, according to an embodiment of the present invention. The reclassification entity 223 described in FIG. 8B uses a relative frequency dictionary to help identify a proper classification for the document 200 as will be described. Beginning with box 543, first the relative frequency of each term that occurs in the document 200 is identified. Thereafter, in box 546 a metric is calculated that reflects the term frequency determined in 543 divided by the inverse of the relative frequency of the term in the relative frequency dictionary. In this respect, the general relative frequency of the appearance of each word in a generic language sense is calculated and stored, for example, in the appropriate salient index dictionary 253.

Thereafter, in box 549, a number of putative indices are identified and are ranked according to a predefined priority. For example, the putative indices are identified as those indices having the highest metrics calculated in box 546 above a predefined threshold. Alternatively, a predefined number of indices are selected from those identified having the highest metrics calculated in box 546. The putative indices are ranked according to the magnitude of the metric calculated in box 546 for each term.

Thereafter, in box 553, the indices 239 associated with the ground truth documents 233 are searched to find the putative indices identified in box 549 therein. Finally, in box 556, every classification 236 associated with any of the ground truth documents 233 that have indices 239 that match the putative indices identified in box 549 are recorded. Thereafter, the reclassification entity 223 provides the results to the document indexing orchestrator 209 in order to reclassify the document 200 for continued attempts at index extraction, as described above.

Figure 8C:
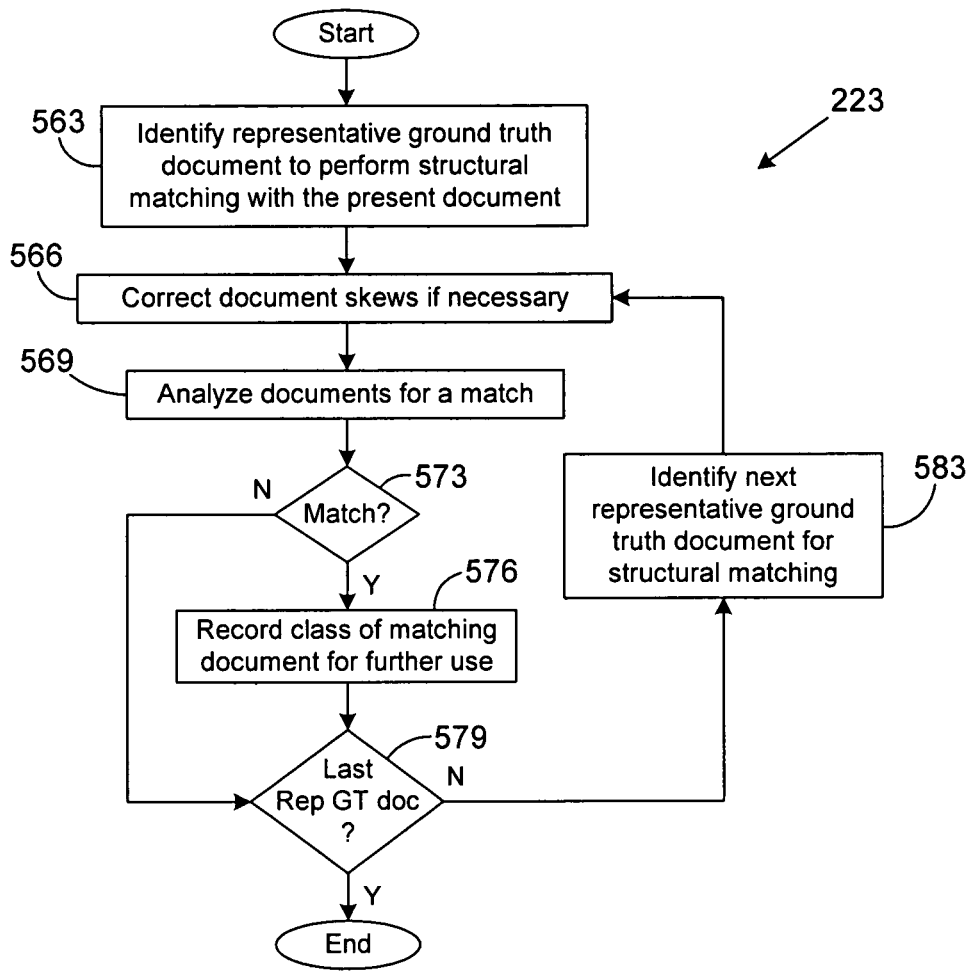

With reference to FIG. 8C, shown is further example of the reclassification entities 223, according to an embodiment of the present invention. The reclassification entity 223 of FIG. 8C is executed to identify those ground truth documents 233 that include a structural layout that matches the structural layout of the current document 200. Based on the match between such ground truth documents 233 and the document 200, the classification 236 of the matching ground truth document 233 may be taken as the classification 236 of the document 200, as will be described.

Beginning with box 563, the reclassification entity 223 identifies a representative ground truth documents 233 to perform structural matching with the present document 200. Such representative ground truth documents 233 may have been designated, for example, by a system administrator. Alternatively, all of the ground truth documents 233 may be searched. Thereafter, in box 566, any document skew detected in the ground truth document 233 identified in box 563 is corrected. Also, any skew detected in the document 200 is corrected as well.

Next, in box 569, both the representative ground truth document 233 and the document 200 are analyzed for matching structure. This may be done, for example, by subtracting the structural content of one of the documents from the other on a pixel by pixel basis to determine how much content remains. If relatively little content remains after the subtraction, then the documents can be deemed to match. In box 573, if a match is detected then the reclassification entity 223 proceeds to box 576. Otherwise, the reclassification entity 223 proceeds to box 579. In box 576, the class of the matching ground truth document is recorded for future use.

Thereafter, in box 579, it is determined whether the last representative ground truth document 233 has been compared to the current document 200, as described above. If not, then the reclassification entity 223 proceeds to box 583, in which the next representative ground truth document is designated for structural matching. Thereafter, the reclassification entity 223 reverts back to box 566. In this respect, the reclassification entity 223 provides the results of those classes that include documents matching the structural format of the document 200 to the document indexing orchestrator 209.

Thereafter, the document indexing orchestrator 209 will reclassify the document 200 based upon the information from one or more reclassification entities 223. In this respect, the document indexing orchestrator 209 may employ a voting, weighted voting, or a confusion matrix approach to combine the results from multiple reclassification entities 223 if necessary to identify the optimal one of the classifications 236 for which the document 200 should be reclassified.

Although the automated document indexing system 136 is embodied in software or code executed by general purpose hardware as discussed above, as an alternative the same may also be embodied in dedicated hardware or a combination of software/general purpose hardware and dedicated hardware. If embodied in dedicated hardware, the automated document indexing system 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 1-5, 6A-6G, 7, and 8A-8C show the architecture, functionality, and operation of an implementation of the automated document indexing system 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and/or flow charts of FIGS. 1-5, 6A-6G, 7, and 8A-8C show a specific order of execution, it is understood that the order of execution may differ from that which is depicted. For example, the order of execution of two or more blocks may be scrambled relative to the order shown. Also, two or more blocks shown in succession in FIGS. 6A-6G, 7, and 8A-8C may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the automated document indexing system 136 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the automated document indexing system 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for index extraction, comprising the steps of:
    storing a plurality of ground truth documents in a database, the documents being organized according to a plurality of classifications, each classification having a group of predefined indices;
    classifying a document by drawing an association in a computer system between the document to be indexed and one of the classifications;
    attempting in the computer system to extract from the document at least a subset of the group of predefined indices associated with the one of the classifications; and
    attempting in the computer system to find and correct at least one text recognition error in the document based upon a salient dictionary associated with the one of the classifications upon a failure to extract the subset of the group of predefined indices, wherein anticipated misspellings associated with each of the classifications are stored in the salient dictionary and the document is searched for anticipated misspellings of predefined indices that have not been extracted from the document.

2. The method of claim 1, further comprising the step of making a subsequent attempt in the computer system to extract from the document at least the subset of the group of predefined indices after correcting at least one text recognition error in the document.

3. The method of claim 1, further comprising the step of reclassifying in the computer system the document upon a failure to extract at least the subset of the group of predefined indices from the document.

4. The method of claim 3, wherein the step of reclassifying the document further comprises the steps of:
    organizing a plurality of terms in the document into a number of language groups, each of the language groups being defined by a characteristic of a native language of the document, wherein at least one of the terms is considered to be a putative index;
    searching indices associated with the ground truth documents for occurrences of the putative index; and
    reclassifying the document as belonging to a classification that includes at least one ground truth document that having at least one occurrence of the putative index.

5. The method of claim 4, wherein at least one of language groups is defined by capitalization of the terms.

6. The method of claim 4, wherein at least one of language groups is defined by whether a term appears in a native language dictionary.

7. The method of claim 3, wherein the step of reclassifying the document further comprises the steps of:
    determining a relative frequency of each of the terms in the document;
    identifying at least one putative index of the document based in part upon the relative frequency of each of the terms in the document;
    searching indices associated with the ground truth documents for occurrences of the at least one putative index; and
    reclassifying the document as belonging to a classification that includes at least one ground truth document that having at least one occurrence of the at least one putative index.

8. The method of claim 7, wherein the step of identifying the at least one putative index of the document further comprises:
    calculating a metric for each of the terms in the document as a function of a relative frequency of each term in the document multiplied, respectively, by an inverse of a generalized relative frequency of each term in a native language; and
    selecting at least the term in the document that has the highest one of the metrics calculated as the at least one putative index.

9. The method of claim 3, wherein the step of reclassifying the document further comprises the steps of:
    comparing structure of the document with a structure of each one of a plurality of the ground truth documents; and
    reclassifying the document as belonging to a classification that includes at least one ground truth document that having a structure that substantially matches a structure of the document.

10. A non-transitory computer-readable medium embodying a program for index extraction, comprising:
    a database including a plurality of ground truth documents stored on the computer-readable medium, the documents being organized according to a plurality of classifications, each classification having a group of predefined indices;
    code stored on the computer-readable medium that, when executed by a computer system, provides at least one indexing entity that attempts to extract from a document to be indexed at least a subset of the group of predefined indices associated with one of the classifications; and
    code stored on the computer-readable medium that, when executed by a computer system, provides a corrective engine that attempts to find and correct at least one text recognition error in the document based upon a salient dictionary associated with the one of the classifications upon a failure to extract the subset of the group of predefined indices, wherein anticipated misspellings associated with each of the classifications are stored in the salient dictionary and the document is searched for anticipated misspellings of predefined indices that have not been extracted from the document so that they may be corrected.

11. The non-transitory computer-readable medium of claim 10, further comprising code that makes a subsequent attempt to extract from the document at least the subset of the group of predefined indices after correcting at least one text recognition error in the document.

12. The non-transitory computer-readable medium of claim 10, wherein the document is classified by association with the one of the classifications, the program further comprising a reclassification engine that reclassifies the document upon a failure to extract at least the subset of the group of predefined indices from the document.

13. The non-transitory computer-readable medium of claim 12, wherein the reclassification engine further comprises:
   code that organizes a plurality of terms in the document into a number of language groups, each of the language groups being defined by a characteristic of a native language of the document, wherein at least one of the terms is considered to be a putative index;
   code that searches indices associated with the ground truth documents for occurrences of the putative index; and
   code that reclassifies the document as belonging to a classification that includes at least one ground truth document that having at least one occurrence of the putative index.

14. The non-transitory computer-readable medium of claim 13, wherein at least one of language groups is defined by capitalization of the terms.

15. The non-transitory computer-readable medium of claim 13, wherein at least one of language groups is defined by whether a term appears in a native language dictionary.

16. The non-transitory computer-readable medium of claim 12, wherein the reclassification engine further comprises:
   code that determines a relative frequency of each of the terms in the document;
   code that identifies at least one putative index of the document based in part upon the relative frequency of each of the terms in the document;
   code that searches indices associated with the ground truth documents for occurrences of the at least one putative index; and
   code that reclassifies the document as belonging to a classification that includes at least one ground truth document having at least one occurrence of the at least one putative index.

17. The non-transitory computer-readable medium of claim 16, wherein the code that identifies the at least one putative index of the document further comprises:
   code that calculates a metric for each of the terms in the document as a function of a relative frequency of each term in the document multiplied, respectively, by an inverse of a generalized relative frequency of each term in a native language; and
   code that selects at least the term in the document that has the highest one of the metrics calculated as the at least one putative index.

18. The non-transitory computer-readable medium of claim 12, wherein the reclassification engine further comprises:
   code that compares structure of the document with a structure of each one of a plurality of the ground truth documents; and
   code that reclassifies the document as belonging to a classification that includes at least one ground truth document that having a structure that substantially matches a structure of the document.

19. An apparatus for index extraction, comprising:
   a processor circuit having a processor and a memory;
   a database stored in the memory, the database including a plurality of ground truth documents, the documents being organized according to a plurality of classifications, each classification having a group of predefined indices;
   a document to be indexed stored in the memory, the document being associated with one of the classifications; and
   an automated document indexing system stored in the memory and executable by the processor, the automated document indexing system comprising:
      at least one indexing entity that attempts to extract from the document at least a subset of the group of predefined indices associated with the one of the classifications; and
      a corrective engine that attempts to find and correct at least one text recognition error in the document based upon a salient dictionary associated with the one of the classifications upon a failure to extract the subset of the group of predefined indices, wherein anticipated misspellings associated with each of the classifications are stored in the salient dictionary and the document is searched for anticipated misspellings of predefined indices that have not been extracted from the document.

20. The apparatus of claim 19, wherein the automated document indexing system further comprises logic that makes a subsequent attempt to extract from the document at least the subset of the group of predefined indices after correcting at least one text recognition error in the document.

21. The apparatus of claim 19, wherein the automated document indexing system further comprises a reclassification engine that reclassifies the document upon a failure to extract at least the subset of the group of predefined indices from the document.

22. The apparatus of claim 21, wherein the reclassification engine further comprises:
   logic that organizes a plurality of terms in the document into a number of language groups, each of the language groups being defined by a characteristic of a native language of the document, wherein at least one of the terms is considered to be a putative index;
   logic that searches indices associated with the ground truth documents for occurrences of the putative index; and
   logic that reclassifies the document as belonging to a classification that includes at least one ground truth document that having the occurrence of the putative index.

23. The apparatus of claim 22, wherein at least one of language groups is defined by capitalization of the terms.

24. The apparatus of claim 22, wherein at least one of language groups is defined by whether a term appears in a native language dictionary.

25. The apparatus of claim 21, wherein the reclassification engine further comprises:
   logic that determines a relative frequency of each of the terms in the document;
   logic that identifies at least one putative index of the document based in part upon the relative frequency of each of the terms in the document;
   logic that searches indices associated with the ground truth documents for occurrences of the at least one putative index; and
   logic that reclassifies the document as belonging to a classification that includes at least one ground truth document having at least one occurrence of the at least one putative index.

26. The apparatus of claim 25, wherein the logic that identifies the at least one putative index of the document further comprises:
- logic that calculates a metric for each of the terms in the document as a function of a relative frequency of each term in the document multiplied, respectively, by an inverse of a generalized relative frequency of each term in a native language; and
- logic that selects at least the term in the document that has the highest one of the metrics calculated as the at least one putative index.

27. The apparatus of claim 21, wherein the reclassification engine further comprises:
- logic that compares structure of the document with a structure of each one of a plurality of the ground truth documents; and
- logic that reclassifies the document as belonging to a classification that includes at least one ground truth document that having a structure that substantially matches a structure of the document.

28. An apparatus for index extraction, comprising:
- a database stored in a memory, the database including a plurality of ground truth documents, the documents being organized according to a plurality of classifications, each classification having a group of predefined indices;
- a document to be indexed stored in the memory, the document being associated with one of the classifications;
- means for attempting to extract from the document at least a subset of the group of predefined indices associated with the one of the classifications; and
- means for attempting to find and correct at least one text recognition error in the document based upon a salient dictionary associated with the one of the classifications upon a failure to extract the subset of the group of predefined indices, wherein anticipated misspellings associated with each of the classifications are stored in the salient dictionary and the document is searched for anticipated misspellings of predefined indices that have not been extracted from the document.

29. The apparatus of claim 28, further comprising means for making a subsequent attempt to extract from the document at least the subset of the group of predefined indices after correcting at least one text recognition error in the document.

30. The apparatus of claim 28, further comprising means for reclassifying the document upon a failure to extract at least the subset of the group of predefined indices from the document.

* * * * *